US011811299B2

(12) United States Patent
Fujimoto

(10) Patent No.: US 11,811,299 B2
(45) Date of Patent: Nov. 7, 2023

(54) DIRECT-CURRENT VOLTAGE CONVERSION CIRCUIT AND SWITCHING POWER-SUPPLY DEVICE

(71) Applicant: Alps Alpine Co., Ltd., Tokyo (JP)

(72) Inventor: Mitsunao Fujimoto, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 168 days.

(21) Appl. No.: 17/405,507

(22) Filed: Aug. 18, 2021

(65) Prior Publication Data

US 2021/0384836 A1    Dec. 9, 2021

Related U.S. Application Data

(63) Continuation of application No. PCT/JP2020/006658, filed on Feb. 20, 2020.

(30) Foreign Application Priority Data

Feb. 22, 2019    (JP) .................. 2019-030060

(51) Int. Cl.
*H02M 1/00*    (2006.01)
*H02M 3/335*   (2006.01)
*H02M 3/00*    (2006.01)

(52) U.S. Cl.
CPC ........... *H02M 1/0058* (2021.05); *H02M 3/01* (2021.05); *H02M 3/33573* (2021.05)

(58) Field of Classification Search
CPC ............. H02M 3/01; H02M 3/33573; H02M 3/33569; H02M 3/335; H02M 1/0058; H02M 1/0054; H02M 1/0048; H02M 1/08

See application file for complete search history.

(56) References Cited

U.S. PATENT DOCUMENTS 6,252,782 B1    6/2001  Akashi et al.
2008/0074905 A1 3/2008  Moiseev et al.
(Continued)

FOREIGN PATENT DOCUMENTS

CN    104467436 A  *  3/2015  ............ H02M 3/156
CN    106 329 940 A    1/2017
(Continued)

OTHER PUBLICATIONS

Extended European Search Report from corresponding European application No. 20759112.4, 8 pp., dated Dec. 19, 2022.
(Continued)

*Primary Examiner* — Gustavo A Rosario-Benitez
(74) *Attorney, Agent, or Firm* — Crowell & Moring LLP

(57) ABSTRACT

A DC voltage conversion circuit includes: a switching circuit having a plurality of switching elements; and a controller that controls operations of the plurality of switching elements. The DC voltage conversion circuit can suppress variations in an output voltage even when an input voltage fluctuates. The controller can execute asymmetric PWM control and phase shift control, performs the phase shift control when a duty ratio is lower than a predetermined ratio, and performs the asymmetric PWM control when the duty ratio is higher than or equal to the predetermined ratio. When switching between the phase shift control and the asymmetric PWM control is performed with the step-down ratios being made to match each other, a control range of the duty ratio can be increased.

7 Claims, 14 Drawing Sheets

(56) References Cited

U.S. PATENT DOCUMENTS

| | | | |
|---|---|---|---|
| 2008/0130328 A1 | 6/2008 | Choi | |
| 2009/0184698 A1* | 7/2009 | Nishikawa | H02M 3/33571 |
| | | | 323/282 |
| 2010/0226154 A1* | 9/2010 | Leu | H02M 3/33569 |
| | | | 363/106 |
| 2010/0294294 A1 | 11/2010 | Wu | |
| 2011/0188275 A1 | 8/2011 | Mino | |
| 2011/0205761 A1* | 8/2011 | Tschirhart | H02M 3/3376 |
| | | | 363/21.02 |
| 2016/0294294 A1* | 10/2016 | Ye | H02M 3/33592 |
| 2017/0004944 A1 | 1/2017 | Seon | |

FOREIGN PATENT DOCUMENTS

| | | |
|---|---|---|
| CN | 106329960 | 1/2017 |
| CN | 107 017 781 A | 8/2017 |
| JP | 2000-232781 | 8/2000 |
| JP | 2008-79454 | 4/2008 |
| JP | 2011-160616 | 8/2011 |
| JP | 2017-199028 | 11/2017 |

OTHER PUBLICATIONS

International Seach Report from corresponding international application No. PCT/JP2020/006658, 8 pp., dated May 20, 2020.

* cited by examiner

DIRECT-CURRENT VOLTAGE CONVERSION CIRCUIT AND SWITCHING POWER-SUPPLY DEVICE

CLAIM OF PRIORITY

This application is a Continuation of International Application No. PCT/JP2020/006658 filed on Feb. 20, 2020, which claims benefit of Japanese Patent Application No. 2019-030060 filed on Feb. 22, 2019. The entire contents of each application noted above are hereby incorporated by reference.

BACKGROUND

1. Field of the Disclosure

The present disclosure relates to a direct-current (DC) voltage conversion circuit and a switching power-supply device including the DC voltage conversion circuit.

2. Description of the Related Art

In transportation equipment, such as vehicles, the amounts of current used in the transportation equipment have increased due to the advancement of electronization of control systems or the incorporation of drive mechanisms, including motors, into the transportation equipment. Thus, in electric vehicles (EVs), plug-in hybrid vehicles (P-HEVs), and so on, high-voltage, insulation-type, and large-DC power supplies are necessary. The increases in the amounts of current required in such equipment is not limited to transportation equipment and is also seen in other equipment. In order to address such increases, circuit systems based on technology for low-loss, insulation-type soft switching are widely used. Specific examples of such circuits include a zero-voltage switching phase shift converter, a zero-voltage switching active clamp converter, and a zero-current-switching inductor-inductor-capacitor (LLC) converter.

One example of such soft-switching-system DC-to-DC converters is a full-bridge switching power-supply device (a zero-voltage-switching phase shift converter) such as that disclosed in Japanese Unexamined Patent Application Publication No. 2000-232781. In the full-bridge switching power-supply device, an on/off operation is alternately performed on each of two pairs of switching means to pass opposite-direction current to a primary side of a transformer located between the pairs of switching means to alternately pass current to two output circuits provided at a secondary side of the transformer.

A plurality of control methods are available for operating full-bridge switching power-supply devices disclosed in Japanese Unexamined Patent Application Publication No. 2000-232781 and so on. For example, Japanese Unexamined Patent Application Publication No. 2011-160616 discloses a starting method for a DC-to-DC conversion circuit that selectively uses phase shift control and pulse width modulation (PWM) control. In this method, during start of the DC-to-DC conversion circuit, conduction ratios of two switching elements to be controlled (the ratios of ON periods of the respective switching elements to the sums (on/off cycles) of the ON periods and OFF periods thereof) are both set low; immediately after the start, phase shift control for increasing a duty ratio while reducing the amount of phase shift is performed, and when the two switching elements reach the same phase, PWM control (hard switching) for making the conduction ratios of the two switching elements match each other and increasing the conduction ratios is performed. The DC-to-DC conversion circuit is started as described above to thereby reduce the possibility that a body diode of each switching element is reversely recovered to break a metal-oxide-semiconductor field-effect transistor (MOSFET) included in the switching element, which is a concern in the phase shift control.

In rechargeable batteries used as DC power supplies in EVs and so on, a voltage at the beginning of discharging and a voltage when a predetermined time passes after the discharging is started differ from each other; the former voltage is high, and the latter voltage is low. A switching power-supply device (a DC-to-DC converter) including a DC-to-DC conversion circuit (a DC voltage conversion circuit) needs to suppress fluctuations in an output voltage so that operation stability of a load connected to the DC voltage conversion circuit can be ensured even when a DC voltage from a rechargeable battery with which voltage fluctuation is inevitable is input thereto. To meet the requirement, control for varying the duty ratio of switching elements in the DC voltage conversion circuit is performed when an input voltage fluctuates. For example, for performing phase shift control on the DC voltage conversion circuit, when the input voltage decreases, control for reducing a phase difference between two switching elements to be controlled, increasing a duty ratio, and increasing a step-down ratio ("output voltage"/"input voltage") is performed to suppress a decrease in the output voltage.

In this case, in the phase shift control, the relationship between the duty ratio and the step-down ratio is a proportional relationship, and thus, when a decrease in the input voltage becomes prominent, it is particularly necessary to increase the duty ratio. When shoot-through current flows in two switching elements connected in series in a full-bridge, the switching elements are broken, and thus a dead-time period needs to be provided between two ON periods of the switching elements. Therefore, the conduction ratio of each switching element is inevitably lower than 50%, and in practice, the upper limit of the conduction ratio of each switching element is about 45%. In the phase shift control, the duty ratio can only be set lower than or equal to the conduction ratio, and thus, when the input voltage decreases to a degree at which the duty ratio exceeds 45%, it is practically difficult to stabilize the output voltage.

The requirement for suppressing fluctuations in the output voltage even when the input voltage fluctuates, as described above, can also apply to cases in which the input voltage increases. A specific example is a case in which charging and discharging are performed at the same time. More specific examples include a case in which an air conditioner is operated while charging is performed in an electric vehicle that is stopped and a case in which an electric vehicle is driven while it is charged with solar photovoltaics or regenerative braking.

SUMMARY

The present invention provides a DC voltage conversion circuit that can suppress fluctuations in an output voltage even when an input voltage fluctuates and a switching power-supply device including the DC voltage conversion circuit.

One aspect of the present disclosure for overcoming the above-described problems provides a DC voltage conversion circuit including: a switching circuit having a plurality of switching elements; and a controller that controls operations of the plurality of switching elements. The controller is capable of executing asymmetric PWM control for controlling a duty ratio by varying a pulse width of two switching elements included in the plurality of switching elements and connected in series and phase shift control for controlling the duty ratio by varying an amount of phase shift of two switching elements included in the plurality of switching elements and not connected in series, performs the phase shift control when the duty ratio is lower than a predetermined ratio, and performs the asymmetric PWM control when the duty ratio is higher than or equal to the predetermined ratio. Switching between the phase shift control and the asymmetric PWM control is performed, with step-down ratios being made to match each other.

Another aspect of the present disclosure provides a switching power-supply device including: the above-described DC voltage conversion circuit; and a DC power supply electrically connected to the input terminal included in the DC voltage conversion circuit.

A DC voltage conversion circuit is provided that can suppress fluctuations in an output voltage even when an input voltage fluctuates. Also, there is provided a switching power-supply device including the DC voltage conversion circuit.

DESCRIPTION OF THE EXEMPLARY EMBODIMENTS

Embodiments of the present invention will be described below with reference to the accompanying drawings.

Figure 1:
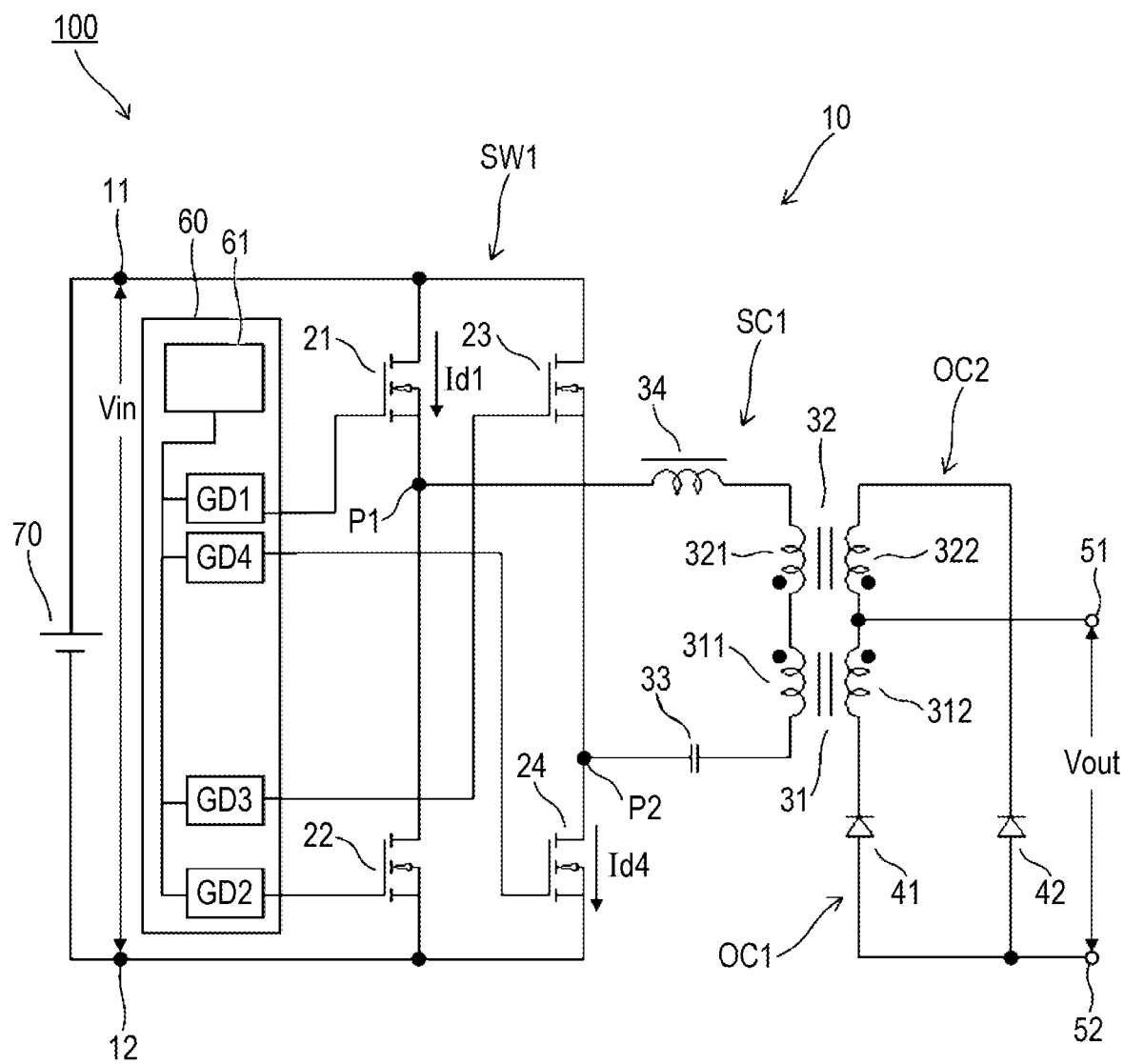
FIG. 1 is a circuit diagram of a power-supply device according to one embodiment of the present invention.

FIG. 1 is a circuit diagram illustrating a power-supply device according to one embodiment. As illustrated in FIG. 1, a switching power-supply device 100 according to one embodiment includes a DC voltage conversion circuit 10 and a DC power supply 70, which is electrically connected to each of a first input terminal 11 and a second input terminal 12 that are included in the DC voltage conversion circuit 10. In FIG. 1, a positive terminal of the DC power supply 70 is connected to the first input terminal 11, and a negative terminal of the DC power supply 70 is connected to the second input terminal 12. The negative terminal of the DC power supply 70 may be connected to a ground terminal, and the second input terminal 12 may be connected to ground.

The DC voltage conversion circuit 10 includes a switching circuit SW1 having a plurality of switching elements. Specifically, in the present embodiment, the switching circuit SW1 includes a first switch 21, a second switch 22, a third switch 23, and a fourth switch 24. Each of these switching elements is a switching element having a field-effect transistor. One end portion of the first switch 21 and one end portion of the third switch 23 are connected in parallel with the first input terminal 11. One end portion of the second switch 22 and one end portion of the fourth switch 24 are connected in parallel with the second input terminal 12. Another end portion of the first switch 21 and another end portion of the second switch 22 are connected to each other, so that the first switch 21 and the second switch 22 constitute a series connection (a half-bridge circuit). Another end portion of the third switch 23 and another end portion of the fourth switch 24 are connected to each other, so that the third switch 23 and the fourth switch 24 constitute a series connection (a half-bridge circuit). Accordingly, in the DC voltage conversion circuit 10, the series connection constituted by the first switch 21 and the second switch 22 and the series connection constituted by the third switch 23 and the fourth switch 24 are connected in parallel between the first input terminal 11 and the second input terminal 12 to constitute a full-bridge circuit. This full-bridge circuit is a central configuration of the switching circuit SW1.

The DC voltage conversion circuit 10 includes a series circuit portion SC1 in which a capacitor 33, a primary side 311 of a first transformer 31, and a primary side 321 of a second transformer 32 are connected in series. The second transformer 32 has a polarity equal to a polarity of the first transformer 31 and is magnetically independent therefrom. The capacitor 33 is a DC-blocking capacitor and prevents large direct current from flowing to the series circuit portion SC1 and the plurality of switches (the first to fourth switches 21 to 24). In the series circuit portion SC1 in the DC voltage conversion circuit 10 illustrated in FIG. 1, a coil 34 is further connected in series with the capacitor 33 and the series connection constituted by the primary side 311 of the first transformer 31 and the primary side 321 of the second transformer 32.

One end portion (a first end portion P1) of the series circuit portion SC1 is connected between the first switch 21 and the second switch 22, which are connected in series, and another end portion (a second end portion P2) of the series circuit portion SC1 is connected between the third switch 23 and the fourth switch 24, which are connected in series.

The DC voltage conversion circuit 10 includes a first output circuit OC1, which includes a secondary side 312 of the first transformer 31 and a first rectifier diode 41 connected in series with the secondary side 312 and in which a first output terminal 51 is provided at an end portion in a rectification direction of a first rectifier diode 41. An output voltage Vout of the first output circuit OC1 is a potential difference of the first output terminal 51 relative to a second output terminal 52 provided at an end portion opposite to the rectification direction of the first rectifier diode 41. The second output terminal 52 may be a ground terminal.

The DC voltage conversion circuit 10 includes a second output circuit OC2, which includes a secondary side 322 of transformer 32 and a second rectifier diode 42 connected in series with the secondary side 322, the first output terminal 51 being connected to an end portion in a rectification direction of the second rectifier diode 42. An end portion opposite to the rectification direction of the second rectifier diode 42 is connected to the second output terminal 52. Accordingly, the first output circuit OC1 and the second output circuit OC2 share outputs (the first output terminal 51 and the second output terminal 52). Also, in the DC voltage conversion circuit 10, the secondary side 312 of the first transformer 31 and the secondary side 322 of the second transformer 32 are connected in series, and the first output terminal 51 is a terminal from which a potential between the secondary side 312 of the first transformer 31 and the secondary side 322 of the second transformer 32 is output.

The DC voltage conversion circuit 10 includes a controller 60 that controls the plurality of switches (the first to fourth switches 21 to 24). The controller 60 in the DC voltage conversion circuit 10 according to the present embodiment can execute asymmetric PWM control and phase shift control, which are described below, and a control switching portion 61 determines which of the controls is to be performed. The controller 60 includes four pulse drive circuits (a first gate drive GD1, a second gate drive GD2, a third gate drive GD3, and a fourth gate drive GD4), and the first to fourth gate drives GD1 to GD4 output ON/OFF signals independently from each other. The controller 60 includes the control switching portion 61, and the four pulse drive circuits (the first gate drive GD1, the second gate drive GD2, the third gate drive GD3, and the fourth gate drive GD4) operate according to a control method determined by the control switching portion 61.

(Asymmetric PWM Control)

Figure 2:
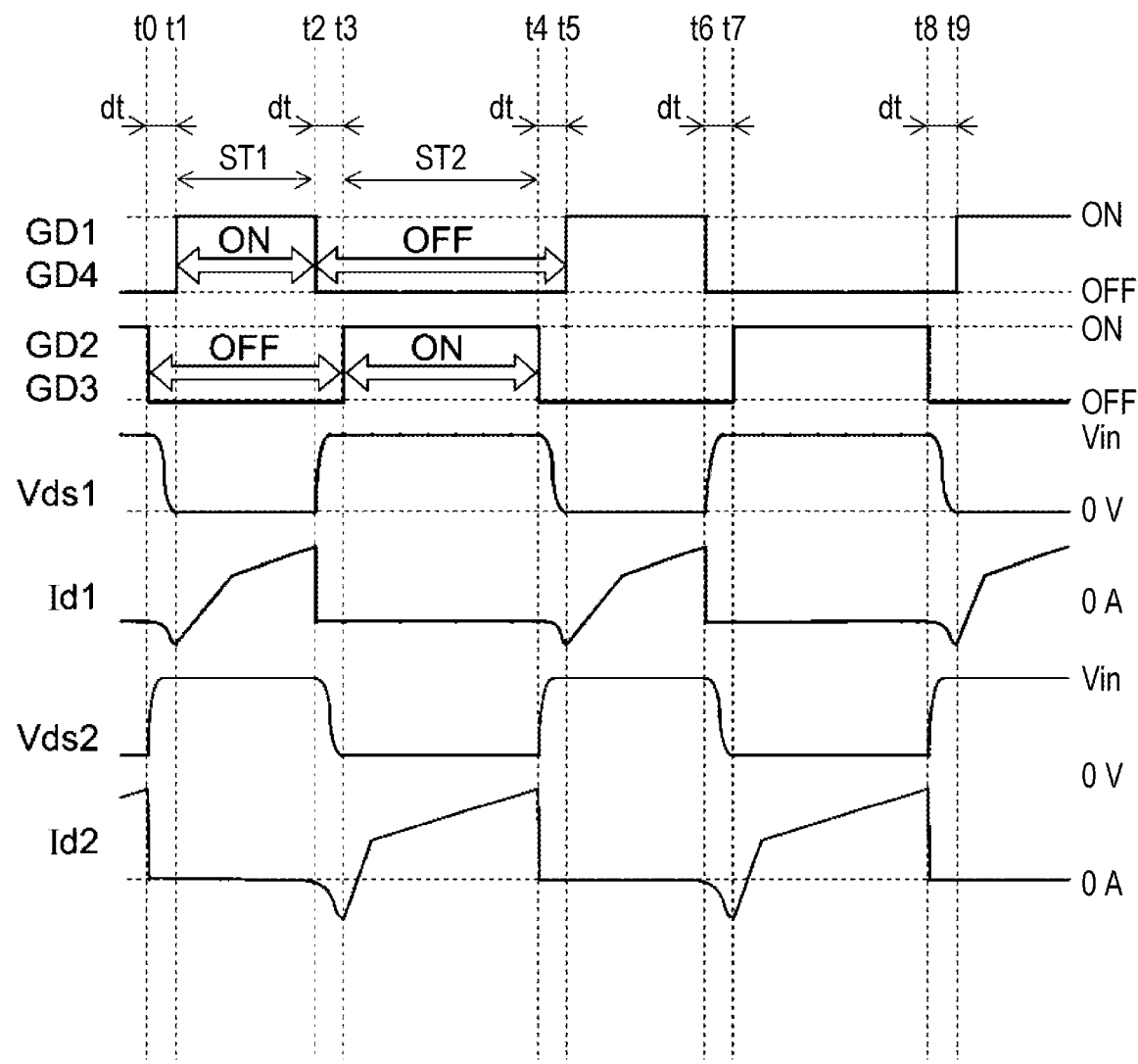
FIG. 2 is a timing chart when the circuit illustrated in FIG. 1 operates with asymmetric PWM control.

First, the asymmetric PWM control will be described. In the asymmetric PWM control, pulse widths of two switching elements (the first and second switches 21 and 22 and the third and fourth switches 23 and 24) that are included in the plurality of switching elements (the first to fourth switches 21 to 24) in the DC voltage conversion circuit 10 and that are connected in series are varied to control a duty ratio. FIG. 2 is a timing chart of the asymmetric PWM control. When the control switching portion 61 determines that the asymmetric PWM control is to be performed, the first gate drive GD1 that drives the first switch 21 and the fourth gate drive GD4 that drives the fourth switch 24 are synchronously controlled, and the second gate drive GD2 that drives the second switch 22 and the third gate drive GD3 that drives the third switch 23 are synchronously controlled.

As illustrated in FIG. 2, the controller 60 alternately performs on/off control with a dead-time period dt on the first switch 21 and the second switch 22. The dead-time period dt is provided in order to prevent shoot-through current from flowing in the circuit, the flowing caused by simultaneously turning on the first switch 21 and the second switch 22, which are connected in series. From the perspective of reliably preventing occurrence of the shoot-through current, it is preferable that the dead-time period dt be 2% or more of the period of one on/off cycle. Since voltage conversion control is not performed in the dead-time period dt, overly increasing the dead-time period dt causes a reduction in conversion efficiency. Accordingly, it is preferable that the dead-time period dt be 10% or less of the period of one on/off cycle.

A specific description will be given with reference to FIG. 2. The first gate drive GD1 that controls the first switch 21 (the fourth gate drive GD4 that controls the fourth switch 24 is also synchronously controlled) is OFF from time t0 to time t1, is ON from time t1 to time t2, and is OFF from time t2 to time t5. Thereafter, similarly, the first gate drive GD1 is ON from time t5 to time t6, is OFF from time t6 to time t9, and is ON at and after time t9. The second gate drive GD2 that controls the second switch 22 (the third gate drive GD3 that controls the third switch 23 is also synchronously controlled) is OFF from time t0 to time t3 and is ON from time t3 to time t4. Thereafter, similarly, the second gate drive GD2 is OFF from time t4 to time t7, is ON from time t7 to time t8, and is OFF from time t8. Accordingly, the dead-time period dt corresponds to a period between time t0 time t1, a period between time t2 and time t3, a period between time t4 and time t5, a period between time t6 and time t7, and a period between time t8 and time t9.

Figure 3:
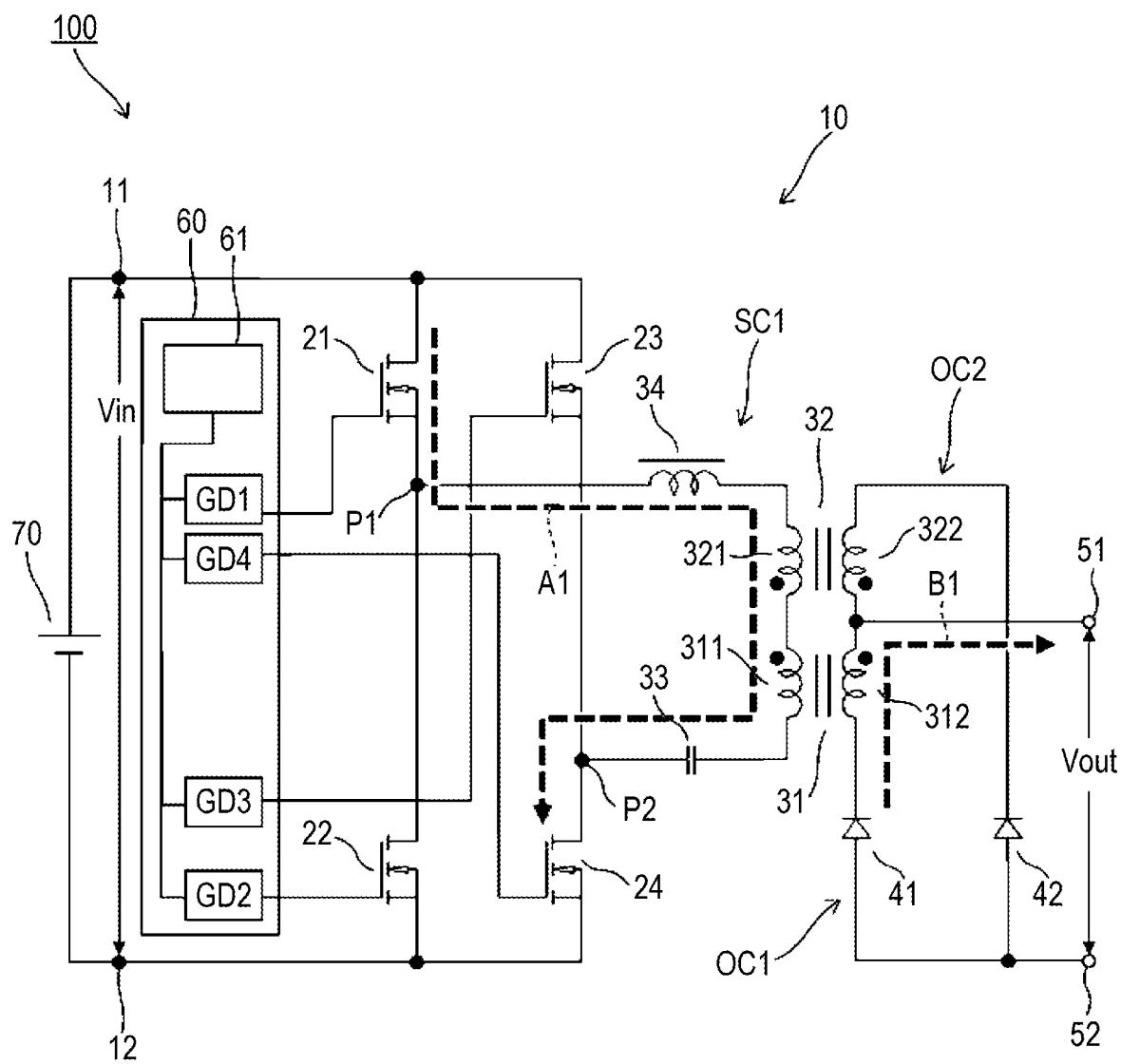
FIG. 3 is a diagram for describing an operation when the circuit illustrated in FIG. 1 operates with the asymmetric PWM control and is in a first state (a case in which a first gate drive and a fourth gate drive are in ON operation, and a second gate drive and a third gate drive are in OFF operation)

When the first gate drive GD1 is turned on at time t1 after time t0, a drain voltage Vds1 of the first switch 21 decreases, and the first switch 21 enters a conductive state. Thus, a drain current Id1 of the first switch 21 increases over time. A drain voltage and a drain current of the fourth switch 24, which operates according to the fourth gate drive GD4, also behaves similarly to the drain current Id1 and the drain voltage Vds1 of the first switch 21. Accordingly, in the period between time t1 and time t2, current flows in the series circuit portion SC1 from the first end portion P1 to the second end portion P2, as indicated by a black dashed-line arrow A1 in FIG. 3. FIG. 3 is a diagram for describing an operation when the circuit illustrated in FIG. 1 operates with the asymmetric PWM control and in a first state ST1 (a case in which the first gate drive GD1 and the fourth gate drive GD4 are in ON operation, and the second gate drive GD2 and the third gate drive GD3 are in OFF operation).

The current that flows in the series circuit portion SC1 gives rise to inverse-electromotive forces at the primary side 311 of the first transformer 31 and the primary side 321 of the second transformer 32. At the secondary side 312 of the first transformer 31, induced current flows (as indicated by a black dashed-line arrow B1 in FIG. 3) in the first output circuit OC1 in accordance with an electromotive force induced by the inverse-electromotive forces. However, since the second output circuit OC2 has the second rectifier diode 42 that passes current from the second output terminal 52 to only the first output terminal 51, no induced current flows in the second output circuit OC2 including the secondary side 322 of the second transformer 32. Since the first transformer 31 and the second transformer 32 are magnetically independent, energy based on the inverse-electromotive force is accumulated in the second transformer 32.

Thereafter, at time t2, the first gate drive GD1 and the fourth gate drive GD4 change from ON to OFF, and in the dead-time period dt between time t2 and time t3, the drain voltage Vds1 increases, and the first switch 21 enters a non-conductive state. Thus, the drain current Id1 of the first switch 21 which has increased since time t1 reaches 0 A at time t2.

Since the second gate drive GD2 and the third gate drive GD3 are turned off at time t0, a drain voltage Vds2 of the second switch 22 increases in the dead-time period dt between time t0 and time t1, and the second switch 22 enters a non-conductive state. Thus, a drain current Id2 of the second switch 22 which has increased until time t0 reaches 0 A at time t0. At time t2, the second gate drive GD2 and the third gate drive GD3 are kept OFF, whereas the first gate drive GD1 and the fourth gate drive GD4 changes from ON to OFF, so that the dead-time period dt between time t2 and time t3 starts. At this point in time, a resonance circuit is formed that includes output capacitors of the first switch 21 and the third switch 23 (drain-source capacitors of the field-effect transistors) and the inductance elements (the coil 34 and the second transformer 32). Voltage fluctuations due to resonance in the resonance circuit are superimposed on the drain voltage Vds2 of the second switch 22 in the dead-time period dt between time t2 and time t3, to realize zero voltage switching. Also, since a current due to the resonance circuit is superimposed on the drain current Id2 of the second switch 22, the current Id2 temporarily becomes negative current to realize soft switching.

Figure 4:
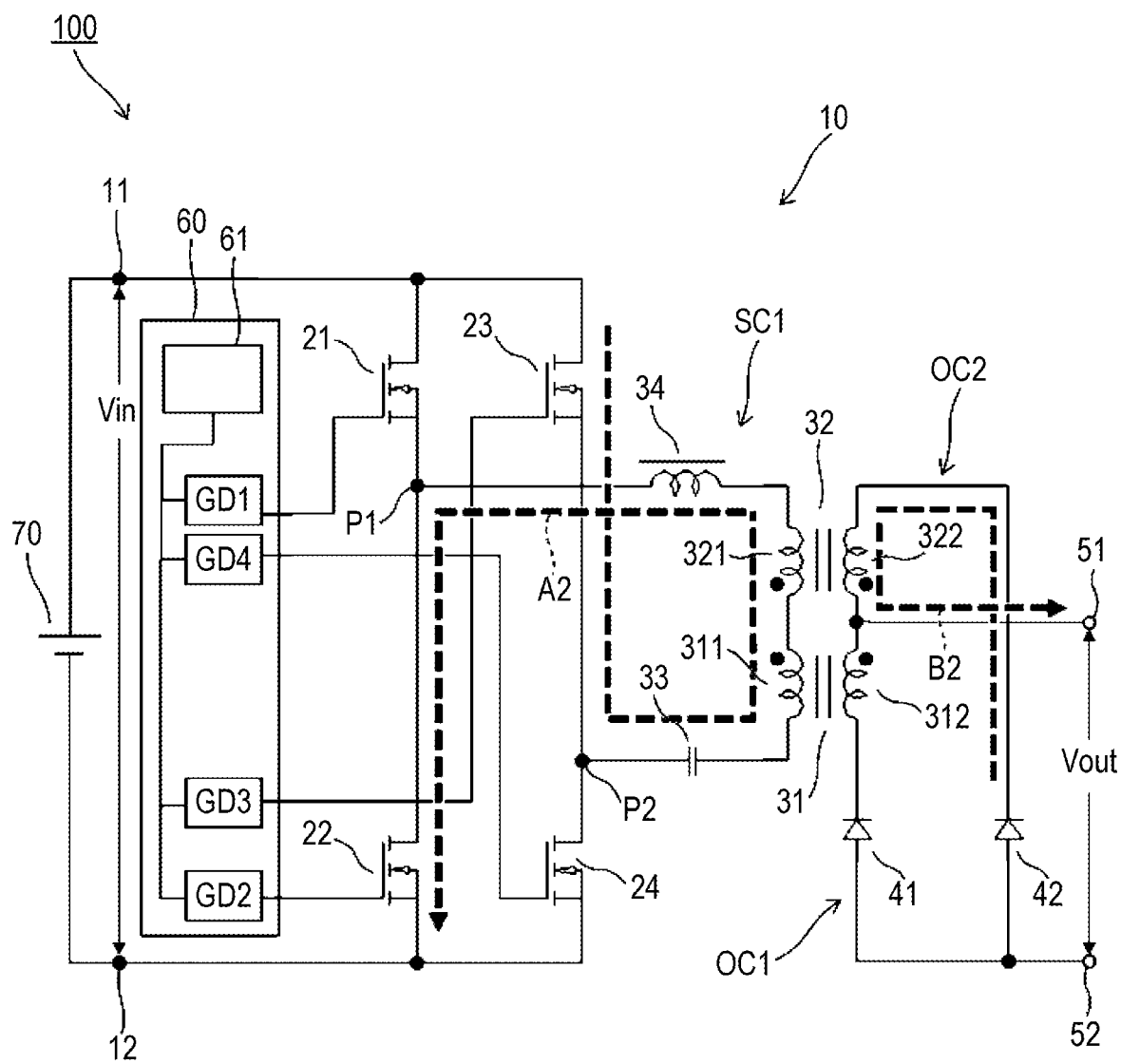
FIG. 4 is a diagram for describing an operation when the circuit illustrated in FIG. 1 operates with the asymmetric PWM control and is in a second state (a case in which the second gate drive and the third gate drive are in ON operation and the first gate drive and the fourth gate drive are in OFF operation)

When the second gate drive GD2 is turned on at time t3, influences of resonance based on charges accumulated in the output capacitors of the first switch 21 and the third switch 23 decrease, so that the drain voltage Vds2 of the second switch 22 decreases steadily, and the second switch 22 enters a conductive state. Thus, the drain current Id2 of the second switch 22 increase over time. A drain voltage and a drain current of the third switch 23, which operates according to the third gate drive GD3, also behaves similarly to the drain voltage Vds2 and the drain current Id2 of the second switch 22. Accordingly, in the period from time t3 to time t4, current flows in the series circuit portion SC1 from the second end portion P2 to the first end portion P1, as indicated by a black dashed-line arrow A2 illustrated in FIG. 4. FIG. 4 is a diagram for describing an operation when the circuit illustrated in FIG. 1 operates with the asymmetric PWM control and is in a second state ST2 (a case in which the second gate drive GD2 and the third gate drive GD3 are in ON operation and the first gate drive GD1 and the fourth gate drive GD4 are in OFF operation).

The current that flows in the series circuit portion SC1 also gives rise to inverse-electromotive forces at the primary side 311 of the first transformer 31 and the primary side 321 of the second transformer 32. At the secondary side 322 of the second transformer 32, induced current flows (as indicated by a black dashed-line arrow B2 in FIG. 4) in the second output circuit OC2 in accordance with an electromotive force induced by the inverse-electromotive forces. However, since the first output circuit OC1 has the first rectifier diode 41 that passes current from the second output terminal 52 to only the first output terminal 51, no induced current flows in the first output circuit OC1 including the secondary side 312 of the first transformer 31. Since the first transformer 31 and the second transformer 32 are magnetically independent, energy based on the inverse-electromotive force is accumulated in the first transformer 31.

As described above, in the asymmetric PWM control, when a DC voltage is applied between the first input terminal 11 and the second input terminal 12, the controller 60 alternately performs on/off control with the dead-time period dt on the first switch 21 and the second switch 22 to thereby alternately reverse the direction of current that flows in the series circuit portion SC1. Owing to the control of the controller 60, the first state ST1 and the second state ST2 occur alternately. In the first state ST1, the first switch 21 and the fourth switch 24 are ON, current flows (as indicated by the black dashed-line arrow B1) in the first output circuit OC1 in the rectification direction of the first rectifier diode 41, and electrical energy is accumulated in the second transformer 32. In the second state ST2, the second switch 22 and the third switch 23 are ON, current flows (as indicated by the black dashed-line arrow B2) in the second output circuit OC2 in the rectification direction of the second rectifier diode 42, and electrical energy is accumulated in the first transformer 31. In the DC voltage conversion circuit 10 according to the embodiment, all the periods during which the first switch 21 and the fourth switch 24 are ON correspond to the first state ST1, and all the periods during which the second switch 22 and the third switch 23 are ON correspond to the second state ST2, as illustrated in FIG. 2.

Thus, in the asymmetric PWM control, the controller 60 can change a potential difference (the output voltage Vout) of the first output terminal 51 relative to the second output terminal 52 by changing at least one of a conduction ratio D1 of the first switch 21 and a conduction ratio D2 of the second switch 22. The conduction ratio is the ratio of the ON period of each switching element to the on/off cycle thereof, and the conduction ratio D1 of the first switch 21 and the conduction ratio D2 of the second switch 22 satisfy the following condition:

$0<D1<1,$ $0<D2<1,$ $D1 \neq D2,$ and $0<D1+D2<1.$

Owing to D1≠D2 as noted above, the amount of current that flows in the direction indicated by the black dashed-line arrow A1 in the first state ST1 and the amount of current that flows in the direction indicated by the black dashed-line arrow A2 in the second state ST2 do not match each other (are asymmetric). Thus, the capacitor 33, which is a DC blocking capacitor, is provided in the series circuit portion SC1 so that DC components of current that flows in the series circuit portion SC1 are not generated, that is, so that current does not flow in the series circuit portion SC1 from the first end portion P1 to the second end portion P2 (for D1>D2), as indicated by the black dashed-line arrow A1, or from the second end portion P2 to the first end portion P1 (for D1<D2), as indicated by the black dashed-line arrow A2.

In this case, when the dead-time period dt provided after the period during which the first switch 21 and the fourth switch 24 are ON is sufficiently longer than the period during which the first switch 21 and the fourth switch 24 are ON, and the dead-time period dt provided after the period during which the second switch 22 and the third switch 23 are ON is sufficiently shorter than the period during which the second switch 22 and the third switch 23 are ON, the relationship "D1+D2≈1" holds.

In this case, the conduction ratio D1 of the first switch 21 becomes a duty ratio Da of the asymmetric PWM control, and by using the duty ratio Da (0<Da<1, where Da=0.5 is excluded) and the turns ratio ("the number of primary-side turns"/"the number of secondary-side turns") n of the transformer, the relationship between the output voltage Vout and an input voltage Vin of the DC voltage conversion circuit 10 is represented as:

$$Vout=2\times Da\times(1-Da)\times Vin/n.$$

In this case, the turns ratio of the first transformer 31 and the turns ratio of the second transformer 32 are set equal to each other.

When the ratio of the output voltage Vout to the input voltage Vin in the asymmetric PWM control is defined as a step-down ratio Ra, the equation noted above can be represented as:

$$Ra=2\times Da\times(1-Da)/n.$$

Figure 5:
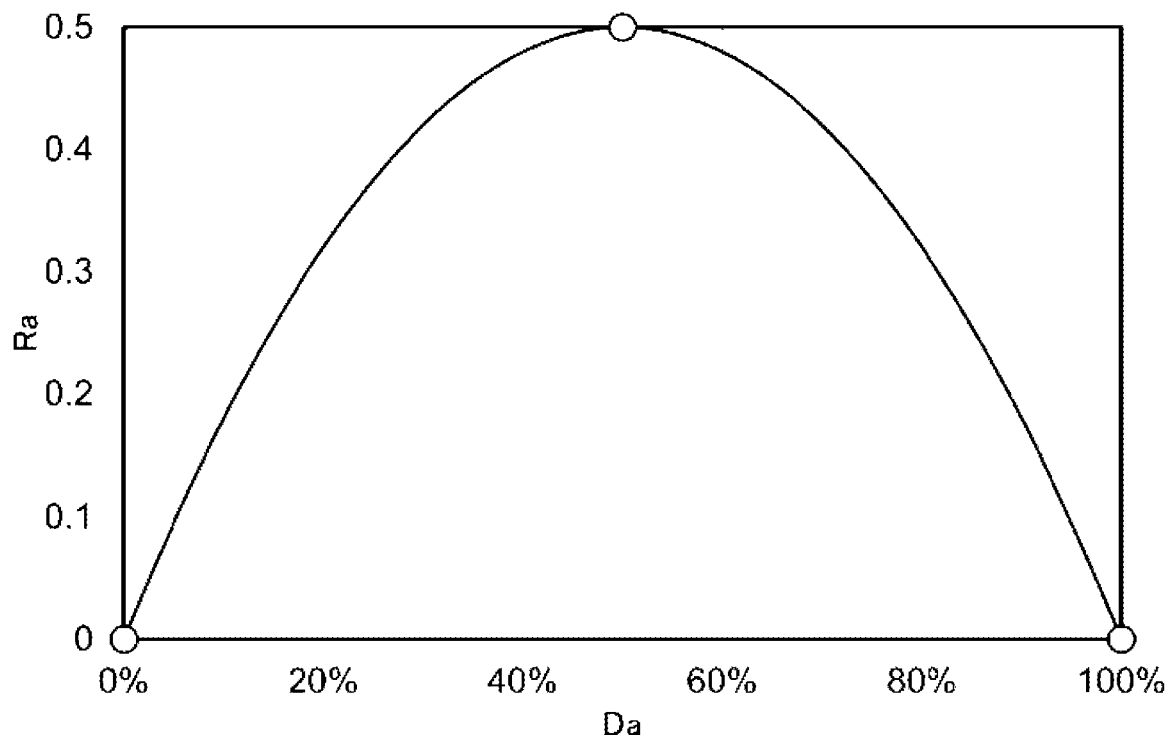
FIG. 5 is a graph illustrating a relationship between a step-down ratio and a duty ratio in the case of the asymmetric PWM control.

FIG. 5 is a graph (where n=1) illustrating a relationship between the step-down ratio Ra and the duty ratio Da in the asymmetric PWM control. Because of having such a relationship, it is sufficient that Da be controlled in the range of 0<Da<0.5 or 0.5<Da<1 in order to maintain the output voltage Vout when the input voltage Vin fluctuates.

Figure 6A:
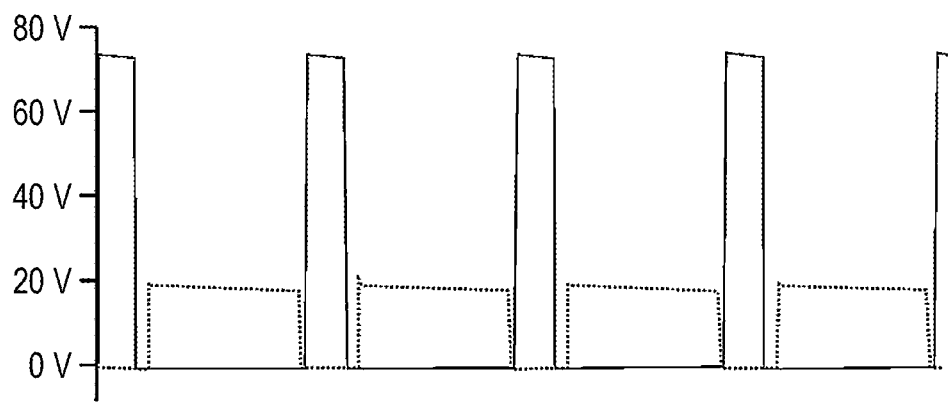
FIG. 6A is a graph illustrating a specific example (the duty ratio: 17%) of an output waveform in the case of the asymmetric PWM control.
Figure 6B:
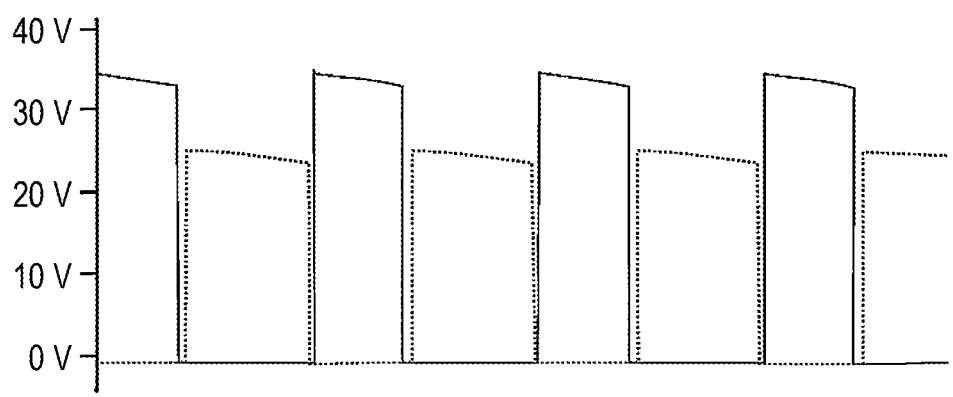
FIG. 6B is a graph illustrating a specific example (the duty ratio: 34%) of the output waveform in the case of the asymmetric PWM control.

FIGS. 6A and 6B are graphs illustrating specific examples of output waveforms in the case of the asymmetric PWM control. FIG. 6A illustrates waveforms of output voltage pulses that occur in the output circuits (the first output circuit OC1 and the second output circuit OC2) when the input voltage Vin is 400 V and the duty ratio Da is 17% in a case in which the turns ratio n is 8. When the duty ratio Da in the asymmetric PWM control is 17%, the conduction ratios D1 and D4 of the first gate drive GD1 and the fourth gate drive GD4 are 17%, which is the same as the duty ratio Da, whereas the conduction ratios D2 and D3 of the second gate drive GD2 and the third gate drive GD3 are about 83% (the length of the dead-time period dt is sufficiently short and is thus disregarded).

Thus, as illustrated in FIG. 6A, the waveform (indicated by a solid line in FIG. 6A) created by the voltage pulse output from one (e.g., the first output circuit OC1) of the output circuits and the waveform (indicated by a dotted line in FIG. 6A) created by the voltage pulse output from another output circuit (the second output circuit OC2) significantly differ from each other, and in particular, the peak voltage of the voltage pulse having a small pulse width increases, specifically, the peak voltage reaches 75 V. Thus, the diode (the second rectifier diode 42) provided in the output circuit (the second output circuit OC2), not the output circuit (the first output circuit OC1) that generates the voltage pulse having the small pulse width, requires a function that does not pass current even when a voltage of 75 V is applied in the direction opposite to the rectification direction. The peak voltage of the voltage pulse having the small pulse width is 21 V, and a peak voltage difference between two voltage pulses is 24 V. Also, an average potential difference (the output voltage Vout) that occurs between the first output terminal 51 and the second output terminal 52 in the above-described case (the input voltage Vin: 400 V, the duty ratio Da: 17%, and the turns ratio n: 8) is 14 V.

FIG. 6B illustrates waveforms of output voltage pulses that occur in the output circuits (the first output circuit OC1 and the second output circuit OC2) when the input voltage Vin is 250 V and the duty ratio Da is 34% in a case in which the turns ratio n is 8. In this case, in voltage pulses output from the two output circuits (one of the voltage pulses is indicated by a solid line in FIG. 6B, and the other is indicated by a dotted line), a difference between waveforms (a difference between pulse widths; a difference between peak voltages) is smaller than a difference between the waveforms of the two voltage pulses in the case in FIG. 6A. Specifically, the peak voltage of the voltage pulse that occurs in one (e.g., the first output circuit OC1) of the output circuits is 34 V, the peak voltage of the voltage pulse that occurs in the other output circuit (the second output circuit OC2) is 26 V, and the peak voltage difference is 8 V. An average potential difference (the output voltage Vout) that occurs between the first output terminal 51 and the second output terminal 52 in this case (the input voltage Vin: 400 V, the duty ratio Da: 17%, and the turns ratio n: 8) is also 14 V, as in the case in FIG. 6A. That is, even when the input voltage Vin decreases, it is possible to maintain the output voltage Vout by increasing the duty ratio Da.

As is apparent from comparison between the two conditions illustrated in FIGS. 6A and 6B, a withstand voltage that is required for the diodes (the first rectifier diode 41 and the second rectifier diode 42) in the output circuits (the first output circuit OC1 and the second output circuit OC2) increases in the case of the asymmetric PWM control in order to cause stable operation on the condition that the duty ratio Da is small. Specifically, although the withstand voltage needs to be 75 V or higher on the condition (the duty ratio Da: 17%) in FIG. 6A, a withstand voltage may be 34 V on the condition (the duty ratio Da: 34%) in FIG. 6B. In this case, the impedance in a case in a forward direction tends to increase, as the withstand voltage of each rectifier diode increases. This means that use of rectifier diodes having a high withstand voltage increases loss in the output circuits and reduces the conversion efficiency in the DC voltage conversion circuit 10. Accordingly, when the asymmetric PWM control is employed as a control method for the DC voltage conversion circuit 10, it is efficient to use it in a range in which the duty ratio Da is relatively high.

In the DC voltage conversion circuit 10 according to the present embodiment, a resonance circuit, specifically, the coil 34 that interacts with parasitic capacitances of the switches (the first to fourth switches 21 to 24), is provided so that soft switching is performed in the asymmetric PWM control.

Figure 7A:
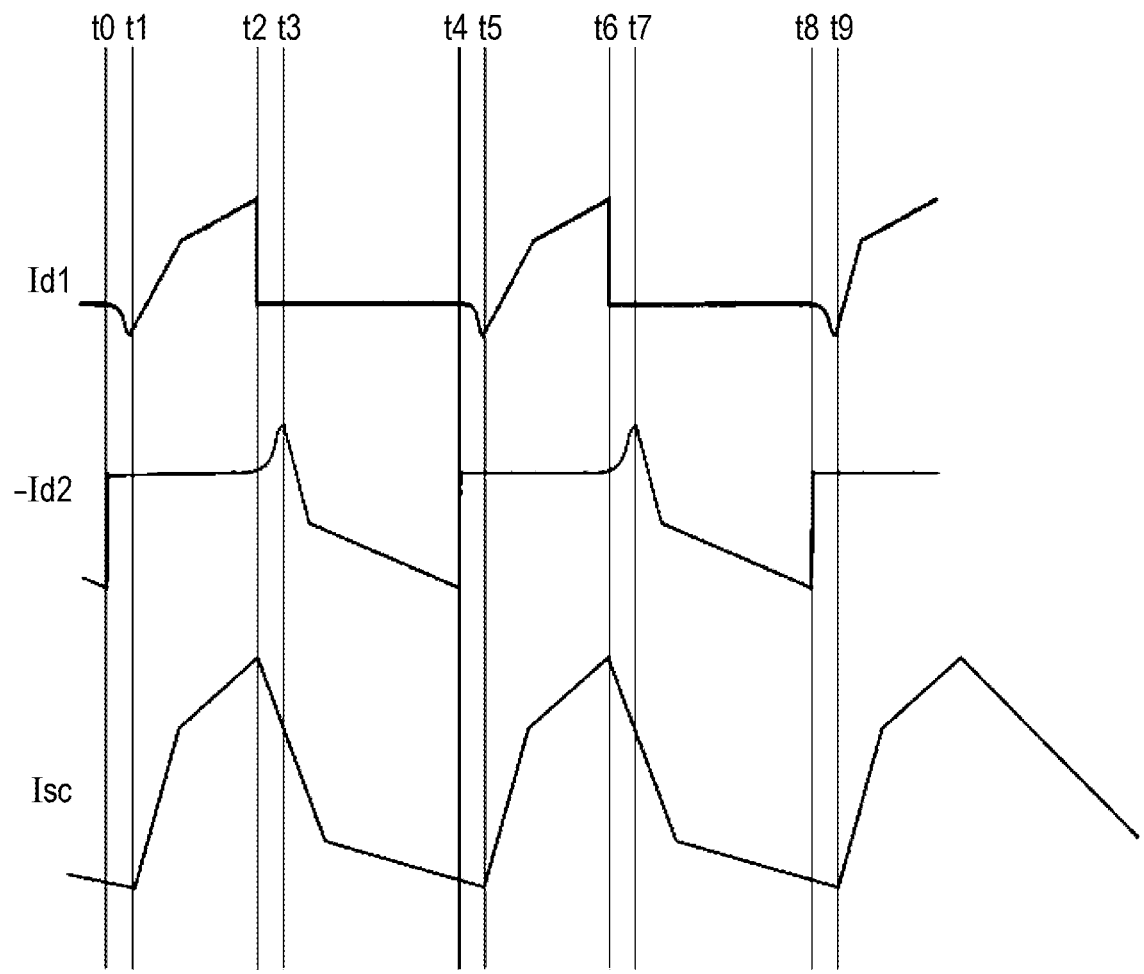
FIG. 7A is a timing chart for describing current that flows in a series circuit portion in the circuit illustrated in FIG. 1.
Figure 7B:
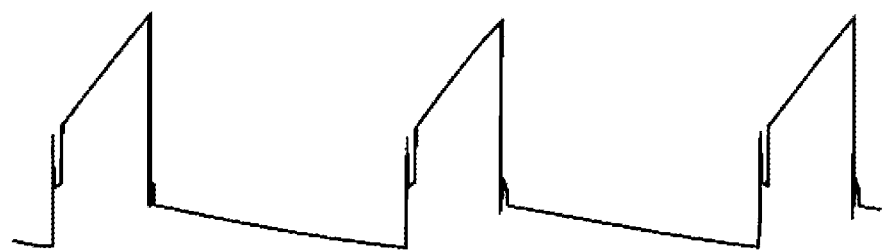
FIG. 7B is a timing chart for describing current that flows in the series circuit portion when a resonance circuit included in the circuit illustrated in FIG. 1 functions properly.

FIG. 7A is a timing chart for describing currents that flow in the series circuit portion in the circuit illustrated in FIG. 1. FIG. 7B is a timing chart for describing current that flows in the series circuit portion when the resonance circuit included in the circuit illustrated in FIG. 1 does not function properly. The current chart at the upper side in FIG. 7A illustrates the drain current Id1 of the first switch 21 illustrated in FIG. 2, and the current chart at the middle in FIG. 7A is obtained by inverting the polarity of the drain current Id2 of the second switch 22 illustrated in FIG. 2. These currents flow in the series circuit portion SC1. Thus, when the flow from the first end portion P1 to the second end portion P2 is assumed to be positive, a current chart obtained by combining the current chart at the upper side in FIG. 7A and the current chart at the middle side in FIG. 7A is a chart of combined current Isc that flows in the series circuit portion SC1, and this chart of the combined current Isc is illustrated at the lower side in FIG. 7A. In the chart of the combined current Isc at the lower side in FIG. 7A, the combined current Isc fluctuates gradually owing to the inductance elements (the coil 34, the first transformer 31, and the second transformer 32) included in the series circuit portion SC1.

When the inductance elements (the coil 34, the first transformer 31, and the second transformer 32) included in the series circuit portion SC1 do not function properly, the combined current Isc changes rapidly in response to the operations of the first gate drive GD1 and the second gate drive GD2, as illustrated in FIG. 7B.

Figure 8A:
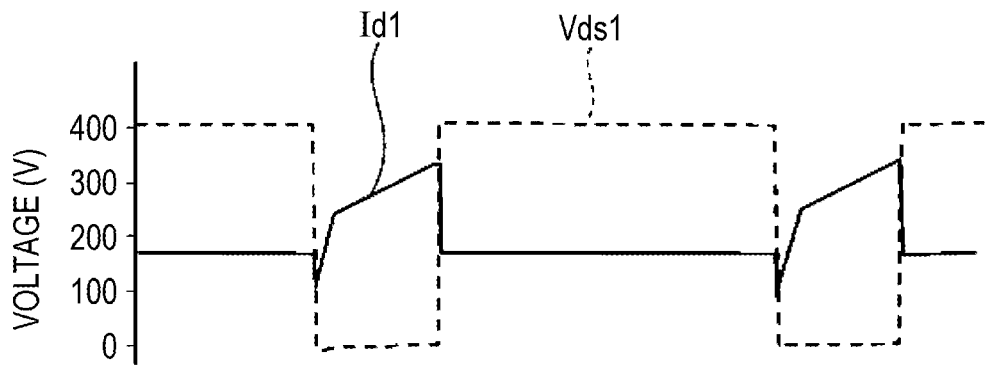
FIG. 8A is a timing chart for describing a case in which the resonance circuit included in the circuit illustrated in FIG. 1 functions properly.
Figure 8B:
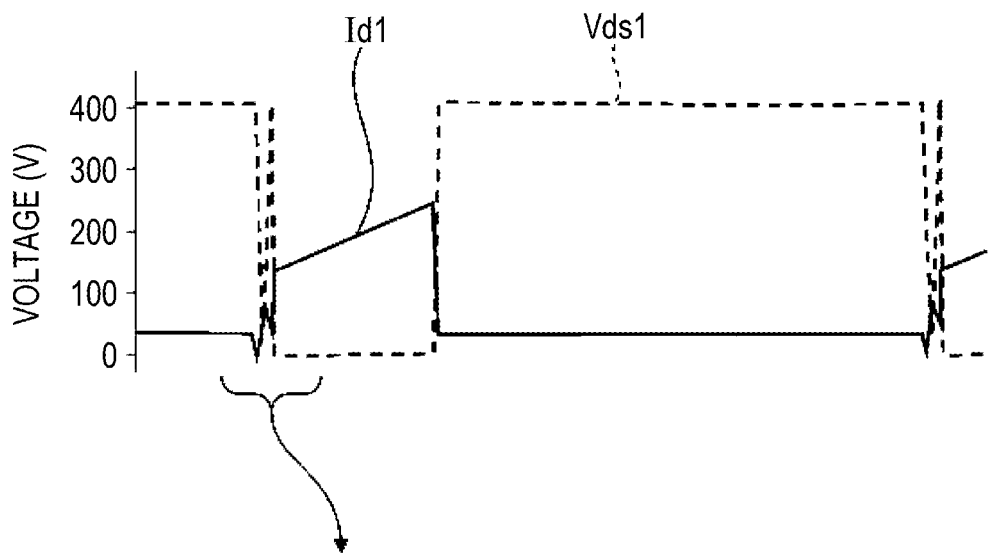
FIG. 8B is a timing chart for describing a case in which resonance circuit included in the circuit illustrated in FIG. 1 does not function properly.
Figure 8C:
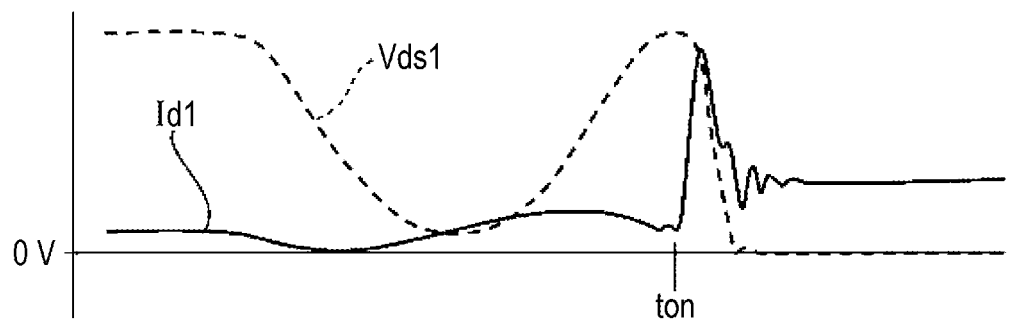
FIG. 8C is a timing chart obtained by enlarging a portion in FIG. 1.

FIG. 8A is a timing chart for describing a case in which the resonance circuit included in the circuit illustrated in FIG. 1 functions properly. FIG. 8B is a timing chart for describing a case in which the resonance circuit included in the circuit illustrated in FIG. 1 does not function properly. FIG. 8C is a timing chart obtained by enlarging a portion in FIG. 8B.

In the DC voltage conversion circuit 10, when the inductance elements in the resonance circuit function properly, such as when the coil 34 is provided in the series circuit portion SC1 and a self-inductance Lr thereof is sufficiently large, the drain voltage Vds1 of the first switch 21 reaches 0 V or lower, and the drain current Id1 flows in the negative direction, as illustrated in FIG. 8A, thereby achieving zero voltage switching. The first transformer 31 or the second transformer 32 may be a part of the resonance circuit.

In contrast, when the inductance elements in the resonance circuit do not function properly (specifically, for example, when the coil 34 is not provided in the series circuit portion SC1, or when the coil 34 is provided but the self-inductance Lr thereof is too small), the impedance of the series circuit portion SC1 increases, as illustrated in FIGS. 8B and 8C. Thus, the amount of current that flows to the capacitance elements (specifically, the output capacitors of the first switch 21 and the fourth switch 24) in the resonance circuit decreases. Thus, the maximum value of the amplitude of a voltage (i.e., a maximum amplitude voltage) generated by the resonance circuit decreases, and the drain voltage Vds1 of the first switch 21 does not decrease to 0 V. Also, since the inductance of the series circuit portion SC1 is small, a time constant τ decreases. In the example illustrated in FIG. 8C, a timing ton at which the field-effect transistor included in the first switch 21 enters the ON operation is delayed relative to the time constant τ. Thus, zero voltage switching is not achieved. Also, a spike-like voltage increase (a surge voltage) occurs in the drain voltage Vds1 of the first switch 21, and this voltage increase can cause noise.

In order for the switching elements, such as the first switch 21, to operate properly, it is preferable that the inductances of the inductance elements in the resonance circuit be large, as described above. From this perspective, the coil 34 is provided. In the DC voltage conversion circuit 10 according to the present embodiment, the first transformer 31 and the second transformer 32 are magnetically independent, and thus when current flows to the output circuit (the first output circuit OC1) with which one (e.g., the first transformer 31) of the transformers 31 and 32 is associated, no current flows to the output circuit (the second output circuit OC2) with which the other transformer (the second transformer 32) is associated. Thus, the primary side (the primary side 321) of the other transformer (the second transformer 32) can function as an inductor, as in the coil 34.

(Phase Shift Control)

Figure 9:
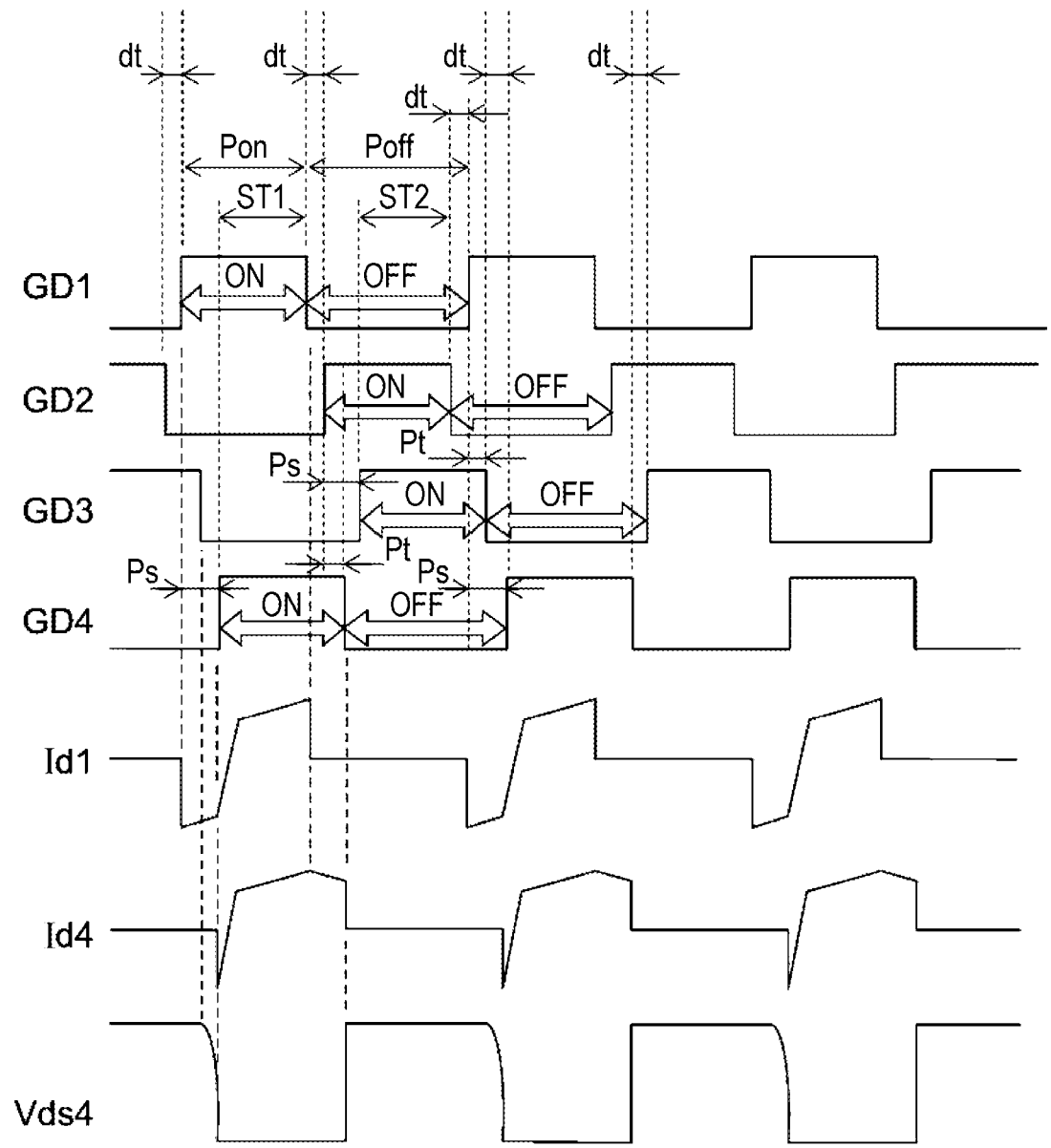
FIG. 9 is a timing chart when the circuit illustrated in FIG. 1 operates with phase shift control.

Subsequently, the phase shift control will be described. In the phase shift control, the amount of phase shift of two switching elements (the first and fourth switches 21 and 24 and the second and third switches 22 and 23) that are included in the plurality of switching elements (the first to fourth switches 21 to 24) in the DC voltage conversion circuit 10 and that are not connected in series is varied to thereby control a duty ratio Dp. FIG. 9 is a timing chart of the phase shift control. The timing chart in FIG. 9 illustrates a timing chart of the first to fourth gate drives GD1 to GD4 as well as a drain current Id1 of the first switch 21, a drain current Id4 of the fourth switch 24, and a drain voltage Vds4 of the fourth switch 24.

When the control switching portion 61 in the controller 60 in the DC voltage conversion circuit 10 determines that the phase shift control is to be performed, on/off control with the dead-time period dt is alternately performed on the first switch 21 and the second switch 22, which are connected in series in the full-bridge circuit. Also, similarly, the conduction ratios of the third switch 23 and the fourth switch 24, which are connected in series in the full-bridge circuit, are made to match each other, and on/off control with the dead-time period dt is alternately performed thereon. This point is the same as in the asymmetric PWM control. The range of preferable lengths of the dead-time period dt is also the same as the range (2% or more and 10% or less of the period of one on/off cycle) in the asymmetric PWM control. Also, in the first state ST1, the first switch 21 and the fourth switch 24 are ON, and in the second state ST2, the second switch 22 and the third switch 23 are on, which is also the same as in the asymmetric PWM control. However, in the phase shift control, synchronous control of the first switch 21 and the fourth switch 24 and synchronous control of the second switch 22 and the third switch 23 are not performed, the ON time of the first switch 21 and the ON time of the fourth switch 24 are displaced, and also the ON time of the second switch 22 and the ON time of the third switch 23 are displaced to thereby set the duty ratio Dp, as described below.

When a DC voltage is applied between the first input terminal 11 and the second input terminal 12, the controller 60 repeatedly turns on and off the first to fourth switches 21 to 24 with the conduction ratios D1 to D4 that are lower than 0.5 and are equal to each other. With respect to each switch, the total period of an ON period Pon during which the switch is in an ON state and an OFF period Poff during which the switch is in an OFF state corresponds to one cycle of the first switch 21. The reason why the conduction ratios D1 to D4 are lower than 0.5 is that the dead-time period dt is provided after the ON period Pon of each switch. In the phase shift control, the inductance of the coil 34 is also set according to parasitic capacitances of the switching elements (the first to fourth switches 21 to 24) so that soft switching is performed in the dead-time period dt.

The controller 60 performs control so that the timings at which the second to fourth switches 22 to 24 are turned on differ from the timing at which the first switch 21 is turned on.

First, upon elapse of a shift period Ps after the first switch 21 is turned on, the fourth switch 24 is turned on to bring about the first state ST1. The shift period Ps is a predetermined period of time shorter than the ON period Pon. In the control of the controller 60 in the DC voltage conversion circuit 10, only a period in which the period during which the fourth switch 24 is ON and the ON period Pon associated with the first switch 21 overlap each other, the fourth switch being turned on with a phase shift relative to the first switch 21, corresponds to the first state ST1, and not the entire ON period Pon of the first switch 21 does not correspond to the first state ST1.

Next, upon elapse of the dead-time period dt after the first switch 21 is turned off, the second switch 22 is turned on. When the first switch 21 is turned off, the first state ST1 ends.

Subsequently, upon elapse of the shift period Ps after the second switch 22 is turned on, the third switch 23 is turned on to bring about the second state ST2. In the phase shift control, only a period in which the period during which the third switch 23 is ON and the ON period Pon associated with the second switch 22 overlap each other, the third switch 23 being turned on with a phase shift relative to the second switch 22, corresponds to the second state ST2, and not the entire ON period Pon of the second switch 22 does not correspond to the second state ST2.

In the phase shift control, the length of the period of the first state ST1 and the length of the period of the second state ST2 are changed to thereby change the potential difference (the output voltage Vout) of the first output terminal 51 relative to the second output terminal 52. In one specific example of the control of the controller 60, when the dead-time period dt is sufficiently shorter than the ON period Pon of each switch, the conduction ratios D1 to D4 can be approximated to 0.5. Thus, the output voltage Vout has a relationship below with the shift period Ps, and it is possible to adjust the output voltage Vout by changing the length of the shift period Ps. Specifically, the duty ratio Dp in the phase shift control is represented by (Pon−Ps)/(Pon+Poff) and is 0<Dp<0.5. The step-down ratio Rp (the ratio of the output voltage Vout to the input voltage Vin) in the phase shift control is represented by the equation below by using the duty ratio Dp and the turns ratio ("the number of primary-side turns"/"the number of secondary-side turns") n of each transformer.

$$Rp=Dp/n$$

Figure 10:
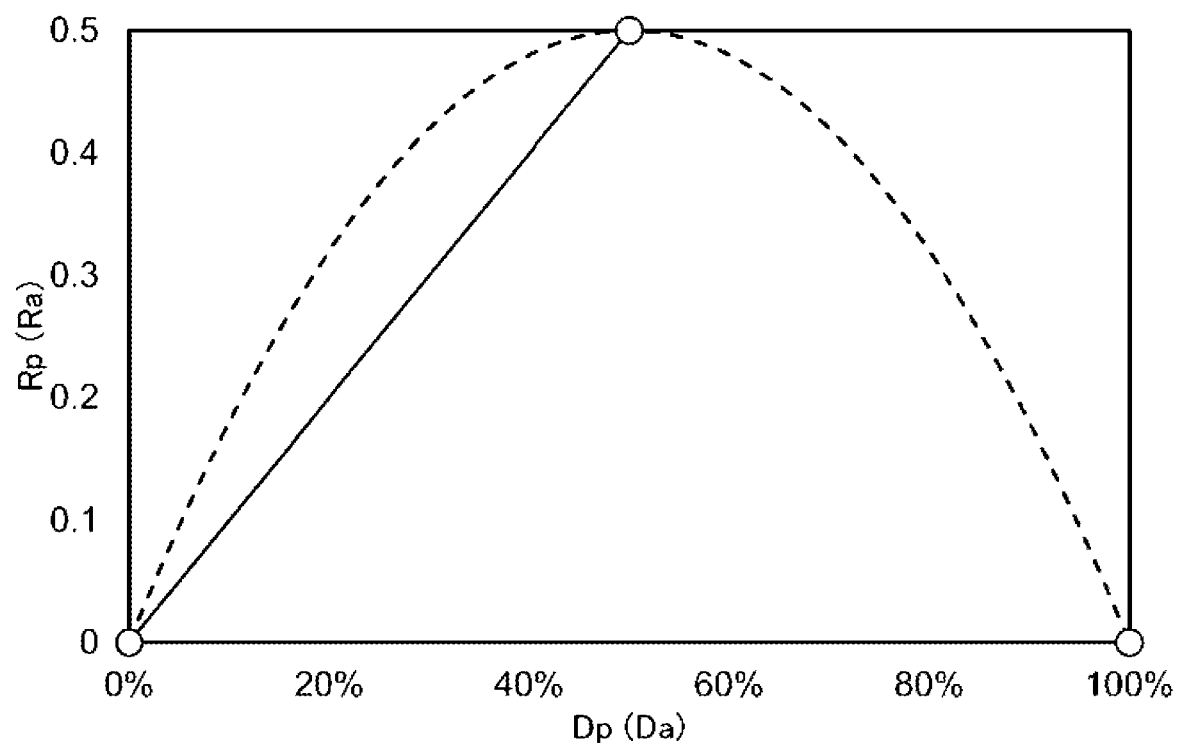
FIG. 10 is a graph illustrating a relationship between a step-down ratio and a duty ratio in the case of the phase shift control.

According to the equation noted above, the relationship between the step-down ratio Rp and the duty ratio Dp is a straight line that passes through a point (Dp, Rp)=(0, 0) and a point (Dp, Rp)=(0.5, 0.5) for n=1. FIG. 10 is a graph (where n=1) illustrating the relationship between the step-down ratio Ra and the duty ratio Da in the phase shift control. Because of having such a relationship, it is sufficient that Dp be controlled in the range of 0<Dp<0.5 in order to maintain the output voltage Vout when the input voltage Vin fluctuates. In FIG. 10, the relationship between the step-down ratio Ra and the duty ratio Da in the asymmetric PWM control is indicated by a dashed line.

When FIG. 10 is compared with FIG. 5 (a graph illustrating the relationship between the step-down ratio Ra and the duty ratio Da in the case of the asymmetric PWM control), a step-down ratio R in the asymmetric PWM control is higher than a step-down ratio R in the phase shift control when the duty ratios D are equal to each other. This is because, in the phase shift control, a commutation period Pt in which the first switch 21 and the third switch 23 are in the ON period and the second switch 22 and the fourth switch 24 are in the OFF period exists in the shift period Ps defined by the first switch 21 the fourth switch 24. In this commutation period Pt, a closed circuit that includes the series circuit portion SC1 and that passes through the first switch 21 and the third switch 23 is formed. The commutation period Pt does not contribute to energy transmission from the input side to the output side. The commutation period Pt also exists in a shift period Ps defined by the second switch 22 and the third switch 23. In contrast, in the asymmetric PWM control, energy transmission from the input side to the output side is performed in periods other than the dead-time period dt. Thus, the step-down ratio R in the asymmetric PWM control becomes higher than the step-down ratio R in the phase shift control, when the duty ratios D are made equal to each other.

Figure 11A:
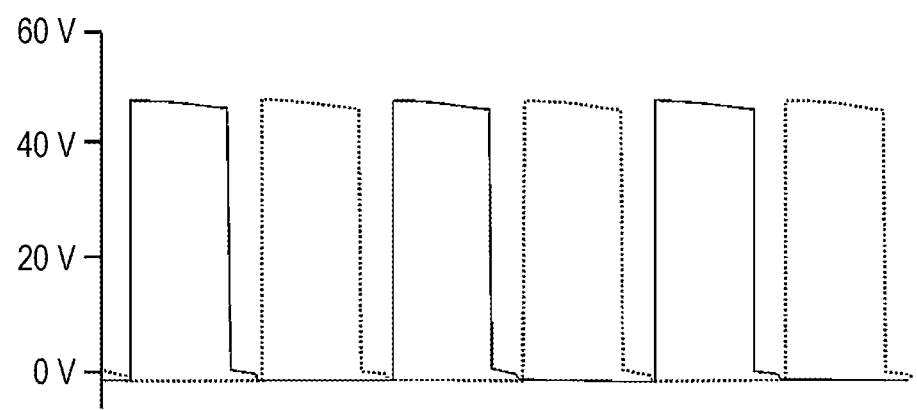
FIG. 11A is a graph illustrating a specific example (the duty ratio: 28%) of an output waveform in the case of the phase shift control.
Figure 11B:
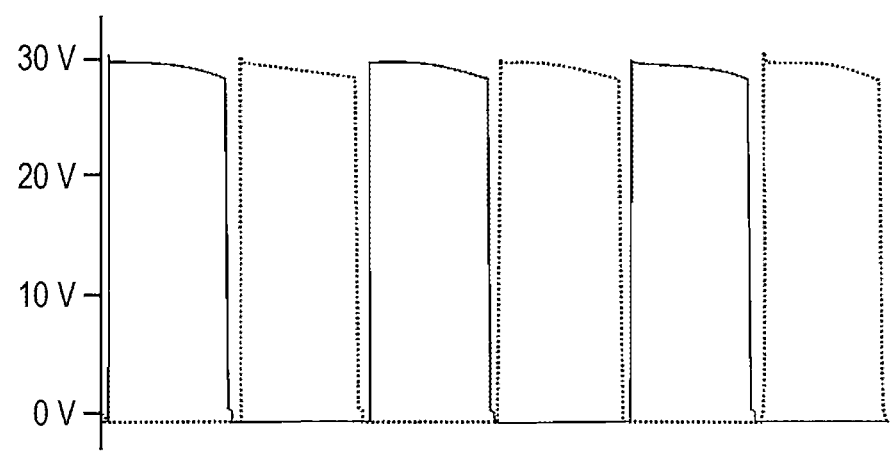
FIG. 11B is a graph illustrating a specific example (the duty ratio: 45%) of the output waveform in the case of the phase shift control.

FIGS. 11A and 11B are graphs illustrating specific examples of output waveforms in the case of the phase shift control. FIG. 11A illustrates waveforms (one of which is denoted by a solid line, and the other is denoted by a dotted line) of output voltage pulses that occur in the output circuits (the first output circuit OC1 and the second output circuit OC2) when the input voltage Vin is 400 V and the duty ratio Da is 28% in a case in which the turns ratio n is 8. FIG. 11B illustrates waveforms (one of which is denoted by a solid line, and the other is denoted by a dotted line) of output voltage pulses that occur in the output circuits (the first output circuit OC1 and the second output circuit OC2) when the input voltage Vin is 250 V and the duty ratio Da is 34% in a case in which the turns ratio n is 8. In each of the cases of the conditions, when the output voltage pulses (the pulse indicated by the solid line and the pulse indicated by the dotted line) that occur in the two output circuits (the first output circuit OC1 and the second output circuit OC2) are compared with each other, the rising timings of the pulses are displaced from each other by a half cycle, but the shapes of the waveforms are equal to each other. The output voltage pulse illustrated in FIG. 11A has a peak voltage of 48 V, which is higher than the peak voltage (30 V) of the output voltage pulse illustrated in FIG. 11B, and has a relatively smaller pulse width than that in FIG. 11B. Thus, an average potential difference (the output voltage Vout) that occurs between the first output terminal 51 and the second output terminal 52 is 14 V in each of the conditions.

A description will now be given in comparison of the results illustrated in FIGS. 11A and 11B with the asymmetric PWM control illustrated in FIGS. 6A and 6B. When the input voltage Vin is 400 V, in the asymmetric PWM control, the duty ratio Da is low (17%), and the peak voltage of the voltage pulse that occurs in the output circuit increases (75 V). In the phase shift control, the duty ratio Dp is high (28%), and the peak voltage of the voltage pulse that occurs in the output circuit is relatively low (48 V). Meanwhile, when the input voltage Vin is 250 V, the duty ratio Dp (45%) in the phase shift control approaches 50%, but the duty ratio Da in the asymmetric PWM control is still low (28%), and the peak voltage (34 V) of the voltage pulse that occurs in the output circuit in the asymmetric PWM control is not much different from the peak voltage (30 V) of the voltage pulse that occurs in the output circuit in the phase shift control.

From those comparisons, a point described below can be understood. That is, when the input voltage Vin is high, and the duty ratio D is relatively low, the phase shift control is employed, and when the input voltage Vin decreases, and the duty ratio Da in the phase shift control increases, switching to the asymmetric PWM control is performed to thereby allow a demerit (when the input voltage Vin decreases, the duty ratio Da needs to be increased, and the control range decreases) of the phase shift control to be covered by a merit (even when the input voltage Vin decreases, and the duty ratio Dp increases, the control range is large) of the asymmetric PWM control.

Also, when the DC voltage conversion circuit 10 is made to operate with the asymmetric PWM control, and the duty ratio Da decreases, the switching to the phase shift control is performed to thereby make it possible to reduce the peak voltage of the voltage pulse that occurs in the output circuit (the first output circuit OC1 or the second output circuit OC2).

(Switching of Controls)

As described above, during operation of the DC voltage conversion circuit, the switching of the controls in which the relationships between the duty ratio D and the step-down ratio R are different from each other are performed so that at least one of the duty ratio D and the step-down ratio R differs. Thus, the switching of the controls makes it possible to transition to a state in which the merit is larger than the merit in the pre-switching control state.

An advantage of the above-described control switching will be described in conjunction with an example of a case in which a rechargeable battery is used as a power source. In the rechargeable battery, a discharging voltage immediately after it is fully charged and a discharging voltage when a predetermined time passes after start of use are different from each other; the former is high, and the latter is low. That is, when the rechargeable battery is used as a power source, the input voltage Vin decreases over time. However, potential changes that are permitted for a load connected to the output terminals (the first output terminal 51 and the second output terminal 52) are limited (to about ±5% in general). Thus, in the DC voltage conversion circuit 10, even when the input voltage Vin decreases, a reduction in the output voltage Vout needs to be controlled. With regard to this point, even when the input voltage Vin decreases in the DC voltage conversion circuit 10, it is possible to maintain the output voltage Vout by increasing the duty ratio D.

Figure 12:
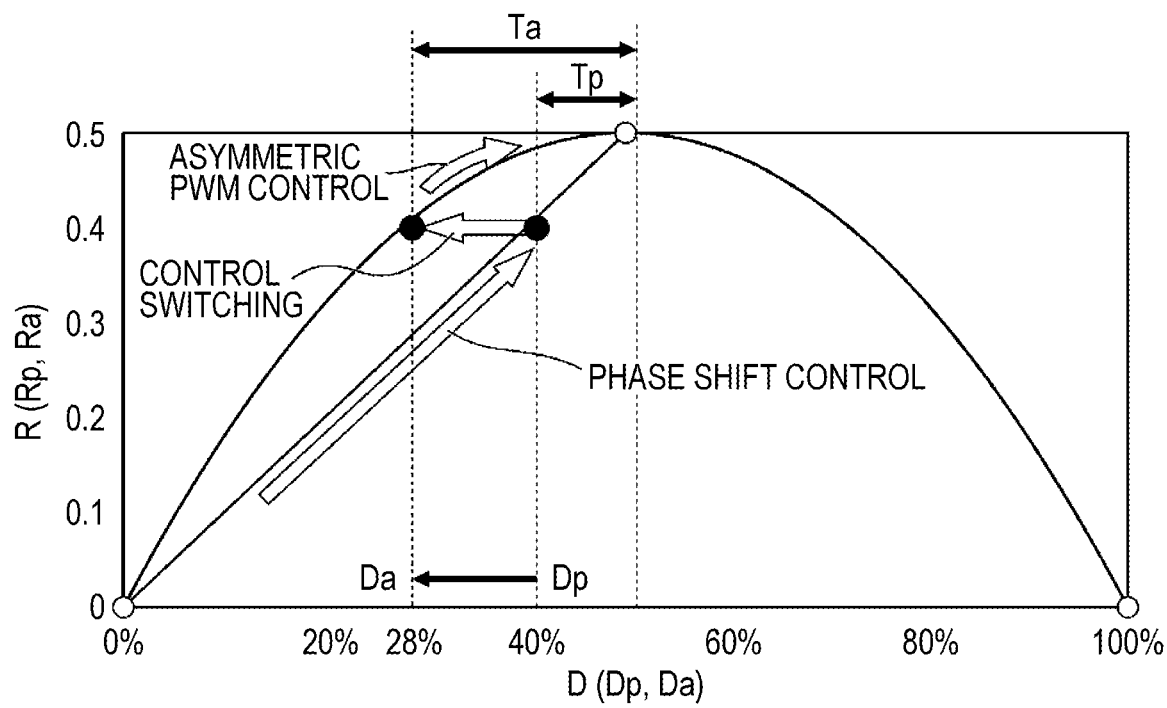
FIG. 12 is a conceptual diagram for describing switching from the phase shift control to the asymmetric PWM control.

In order to cause the DC voltage conversion circuit 10 to operate with the asymmetric PWM control on the condition that the duty ratio Da is low, the withstand voltage of the rectifier diodes in the output circuits needs to be increased, as described above. In the range in which the step-down ratio Ra is close to its upper limit, however, the control range of the duty ratio Da increases in the phase shift control, compared with the duty ratio Dp. Accordingly, in the DC voltage conversion circuit 10 according to the present embodiment, when the duty ratio Dp is lower than a predetermined ratio (FIG. 12 illustrate a case of 40%), the phase shift control is performed, and when the duty ratio Dp in the phase shift control is higher than or equal to the predetermined ratio, the asymmetric PWM control is performed. FIG. 12 is a conceptual diagram for describing switching from the phase shift control to the asymmetric PWM control. The switching between the phase shift control and the asymmetric PWM control is performed, with the step-down ratios R being made to match each other. As a result of the switching of the controls with the step-down ratios R being made to match each other, the duty ratio Da in the asymmetric PWM control immediately after the switching becomes lower than the duty ratio Dp in the phase shift control. Thus, a permissible control range Tp (=50%−Dp) of the duty ratio Dp after the switching becomes larger than a permissible control range Ta (=50%−Da) of the duty ratio Da immediately before the switching. Accordingly, performing the control switching increases controllability of the step-down ratio R.

This switching will be specifically described with reference to FIG. 12. For example, even in a case in which the duty ratio Dp reaches 40% in the phase shift control, when switching to the asymmetric PWM control is performed with the step-down ratios R being made to match each other, the duty ratio Da reaches 28%, and a sufficient control range can be ensured up to 50%. Since the duty ratio Dp in the phase shift control immediately before the control switching is 40%, the permissible control range Tp is only 10%, as illustrated in FIG. 12. However, when the control is switched, the duty ratio Da reaches 28%, and thus the permissible control range Ta increases to 22%.

When an effect of the control switching is described from another perspective, the duty ratio Dp needed to maintain the step-down ratio R is 49.5% in the phase shift control, when the duty ratio Da is 45% in the asymmetric PWM control. Such a duty ratio Dp cannot be set unless the dead-time period dt provided between the ON period of the first switch 21 and the ON period of the second switch 22 is set lower than 1% of one cycle. This also applies to the dead-time period dt provided between the ON period of the third switch 23 and the ON period of the fourth switch 24. Excessively reducing the dead-time period dt increases the possibility that shoot-through current occurs to break the circuit and thus cannot be set in practice.

From the perspective of reducing influences on a load connected to the output terminals, fewer fluctuations in the step-down ratio before and after the control switching are preferable. The relationship between the step-down ratio Rp immediately before the switching and the step-down ratio Ra immediately after the switching is that (Ra−Rp)/Rp is preferably ±5% or less and is more preferably ±3% or less.

A method for determining the timing of switching between the phase shift control and the asymmetric PWM control is not limiting. For example, the control switching portion 61 that is included in the controller 60 and that determines switching of the controls may make the switching determination by using the input voltage Vin as an input or may make the switching determination by using the output voltage Vout (an average potential difference that occurs between the first output terminal 51 and the second output terminal 52) as an input.

In the former case (based on the input voltage Vin), the input voltage Vin for switching from the phase shift control to the asymmetric PWM control, the duty ratio Da for the asymmetric PWM control at the timing of the switching, the input voltage Vin for switching from the asymmetric PWM control to the phase shift control, and the duty ratio Dp for the phase shift control at the timing of the switching are pre-determined. Then, the input voltage Vin is monitored, and when the input voltage Vin decreases, and thus the duty ratio Dp in the phase shift control is to be set to the duty ratio Dp at the pre-determined switching timing, switching to the asymmetric PWM control is performed, and the duty ratio Da is set to a predetermined value. On the other hand, when the input voltage Vin increases, and thus the duty ratio Da in the asymmetric PWM control is to be set to the duty ratio Da at the pre-determined switching timing, switching to the phase shift control is performed, and the duty ratio Dp is set to the predetermined value.

In the latter case (based on the output voltage Vout), the output voltage Vout for switching from the phase shift control to the asymmetric PWM control, the duty ratio Da for the asymmetric PWM control at the timing of the switching, the output voltage Vout for switching from the asymmetric PWM control to the phase shift control, and the duty ratio Dp for the phase shift control at the timing of the switching are pre-determined. Then, the output voltage Vout is monitored, and when the output voltage Vout decreases to a predetermined value, switching is performed from the phase shift control to the asymmetric PWM control, and the duty ratio Da is set to a predetermined value. On the other hand, when the output voltage Vout increases to the predetermined value, switching is performed from the asymmetric PWM control to the phase shift control, and the duty ratio Dp may be set to the predetermined value.

As described above, in the DC voltage conversion circuit 10 according to one embodiment of the present invention, the controller 60 includes the control switching portion 61, and the DC voltage conversion circuit 10 can operate with the phase shift control and the asymmetric PWM control. These controls are switched therebetween to change the on/off timings of the four switching elements (the first to fourth switches 21 to 24) that constitute the full-bridge. Since the on/off control on the switching elements (the first to fourth switches 21 to 24) is performed in the DC voltage conversion circuit 10 at high speed, a transient state occurs frequently when the control switching occurs at an excessively high frequency. The frequent occurrence of such a transient state can have an undesirable influence on control stability. Accordingly, the control switching portion 61 in the controller 60 performs control so that the step-down ratio Rp for switching from the phase shift control to the asymmetric PWM control becomes higher than the step-down ratio Ra for switching from the asymmetric PWM control to the phase shift control. That is, the switching of the two controls is adapted to have hysteresis.

Figure 13:
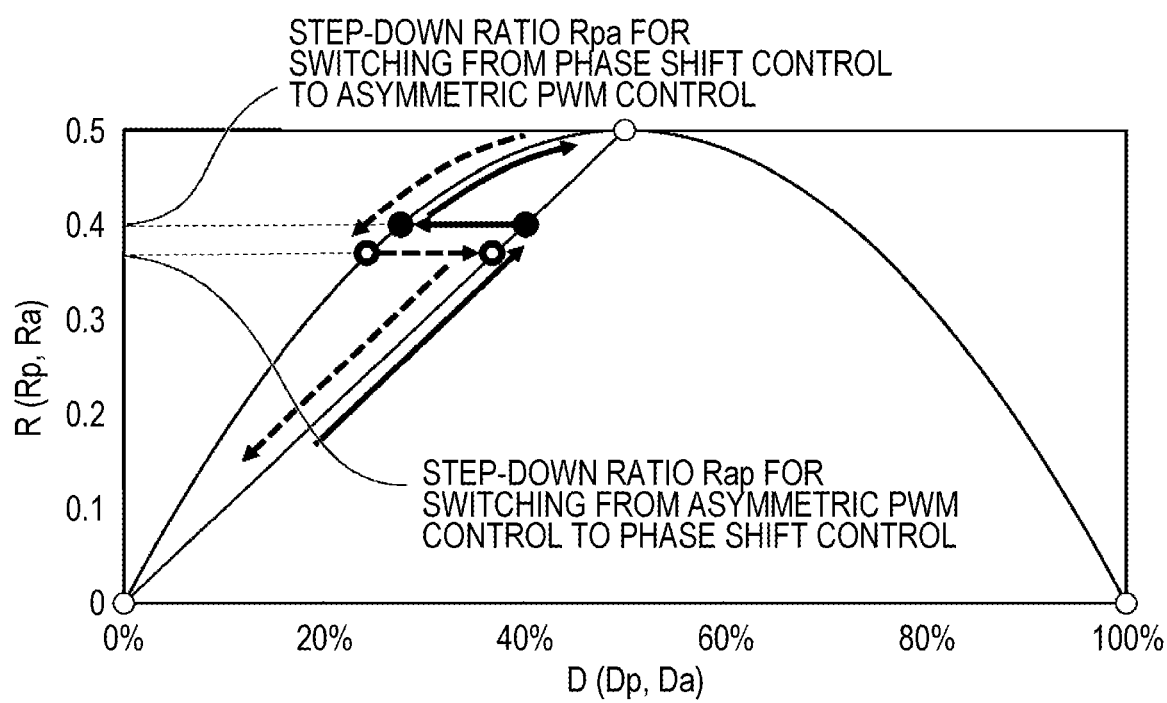
FIG. 13 is a conceptual diagram for explaining that switching of two controls has hysteresis.

FIG. 13 is a conceptual diagram for explaining that switching of the two controls has hysteresis. When the duty ratio Dp increases owing to a reduction in the input voltage Vin from a state in which the step-down ratio R is low and the phase shift control is performed, the step-down ratio Rp also increases. Based on a condition that the step-down ratio Rp reaches a predetermined value Rpa (0.4 V in FIG. 13), the control switching portion 61 performs switching from the phase shift control to the asymmetric PWM control, as indicated by solid-line arrows in FIG. 13. Thereafter, in response to a reduction in the input voltage Vin, the duty ratio Da is increased, and the step-down ratio Ra is increased.

On the other hand, when the duty ratio Da decreases owing to an increase in the input voltage Vin from a state in which the step-down ratio R is high and the asymmetric PWM control is controlled, the step-down ratio Ra also decreases. Based on a condition that the step-down ratio Ra reaches a predetermined value Rap (0.36 V in FIG. 13), the control switching portion 61 performs switching from the phase shift control to the asymmetric PWM control, as indicated by dashed-line arrows in FIG. 12. Thereafter, in response to a reduction in the input voltage Vin, the duty ratio Dp is reduced, and the step-down ratio Rp is reduced.

Figure 14A:
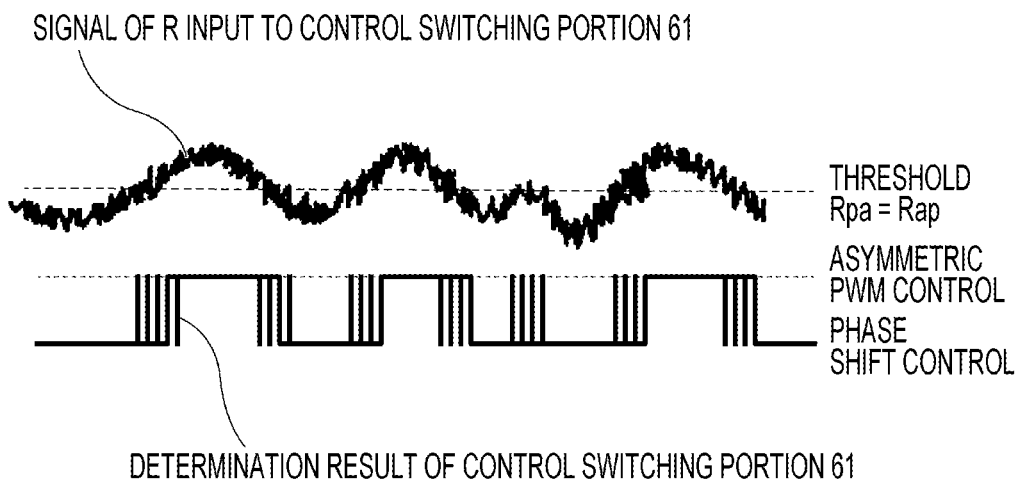
FIG. 14A is a diagram illustrating a specific example in the case of not having hysteresis of switching of the controls.

FIG. 14A is a diagram illustrating a specific example in the case of not having hysteresis of switching of the controls. In a case in which the step-down ratio Rpa for switching from the phase shift control to the asymmetric PWM control is equal to the step-down ratio Rap for switching from the asymmetric PWM control to the phase shift control (Rpa=Rap), during the phase shift control, when a noise signal is superimposed on a measurement value (the input voltage Vin or the output voltage Vout) that gives the step-down ratio R, and the step-down ratio Rp becomes even slightly higher than the step-down ratio Rpa, which serves as a switching threshold for the asymmetric PWM control, the control switching portion 61 determines that switching is performed from the phase shift control to the asymmetric PWM control, so that the control switching is executed. Immediately after the asymmetric PWM control is performed in the manner described above, when the step-down ratio Ra reaches the step-down ratio Rap, which serves as a switching threshold for the phase shift control, owing to an influence of noise included in a measurement signal, the control switching portion 61 determines that switching is to be performed from the asymmetric PWM control to the phase shift control, so that the control switching is executed. Thus, when the step-down ratio R approaches the threshold for the control switching, the control switching portion 61 performs the control switching frequently, as illustrated in FIG. 14A, and thus there is a possibility that the operation of the circuit becomes unstable.

Figure 14B:
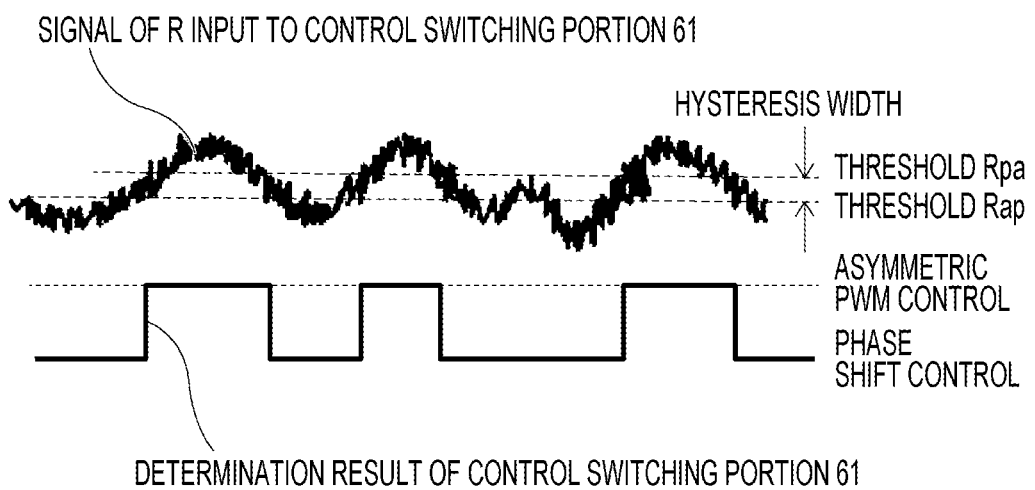
FIG. 14B is a diagram illustrating a specific example in the case of having hysteresis of switching of the controls.

FIG. 14B is a diagram illustrating a specific example in the case of having hysteresis of switching of the controls. In a case in which the step-down ratio Rpa for switching from the phase shift control to the asymmetric PWM control is set higher than the step-down ratio Rap for switching from the asymmetric PWM control to the phase shift control, as illustrated in FIG. 14B, the phase shift control is maintained when the step-down ratio R enters a range (a hysteresis width) of the step-down ratio R between the step-down ratio Rpa and the step-down ratio Rap during the phase shift control, and the control switching to the asymmetric PWM control is performed when the step-down ratio R reaches the step-down ratio Rpa or higher. Similarly, during the asymmetric PWM control, when the step-down ratio R enters the hysteresis width, the asymmetric PWM control is maintained, and when the step-down ratio R reaches the step-down ratio Rap or lower, the control switching to the phase shift control is performed. Thus, even when noise components are included in a signal that gives the step-down ratio R, influences of the noise components are appropriately eliminated to avoid excessively frequent occurrence of the control switching.

The embodiment above has been described for ease of understanding of the present invention and is not intended to limit the present invention. It is, therefore, intended that the elements disclosed in the embodiment above include all design changes and equivalents that belong to the technical scope of the present invention.

For example, although a case in which the power source is a rechargeable battery has been described above as an example, electric generating equipment for solar generation or the like, in addition to the rechargeable battery, may also be included in the power source. In this case, a decrease in the input voltage Vin based on elapse of the discharging time of the rechargeable battery and an increase in the input voltage Vin based on input of electrical energy from electric generating equipment overlap each other, and consequently, there is a possibility that the range of the step-down ratio R to be achieved by the DC voltage conversion circuit 10 increases. Even in such a case, for example, setting the hysteresis width as illustrated in FIG. 14B allows the DC voltage conversion circuit 10 to operate stably.

During control of switching between the phase shift control and the asymmetric PWM control, a switching determination may be made by measuring the input voltage Vin and the output voltage Vout and directly using the measurement result. A duty ratio Dpa for switching from the phase shift control to the asymmetric PWM control and a duty ratio Dap for switching from the asymmetric PWM control to the phase shift control may be pre-determined, and the switching of the controls may be performed at a timing at which the controller determines that the duty ratio Dp is to be set to the duty ratio Dpa or a timing at which the controller determines that the duty ratio Da is to be set to the duty ratio Dap.

What is claimed is:

1. A direct-current voltage conversion circuit comprising:
a switching circuit having a plurality of switching elements; and
a controller that controls operations of the plurality of switching elements,
wherein the controller:
executes an asymmetric pulse-width-modulation control that control a duty ratio by varying a pulse width of two switching elements included in the plurality of switching elements and connected in series and a phase shift control that control the duty ratio by varying an amount of phase shift of two switching elements included in the plurality of switching elements and not connected in series,
performs the phase shift control when the duty ratio is lower than a predetermined ratio, and
performs the asymmetric pulse-width-modulation control when the duty ratio is higher than or equal to the predetermined ratio; and wherein:
switching between the phase shift control and the asymmetric pulse-width-modulation control is performed, with step-down ratios being made to match each other, and
the controller performs control so that the step-down ratio for switching from the phase shift control to the asymmetric pulse-width-modulation control becomes higher than the step-down ratio for switching from the asymmetric pulse-width-modulation control to the phase shift control.

2. The direct-current voltage conversion circuit according to claim 1,
wherein during the asymmetric pulse-width-modulation control, with respect to the two switching elements connected in series in the switching circuit, the controller makes conduction ratios different from each other and alternately performs on/off control with a dead-time period to perform soft switching in the dead-time period.

3. The direct-current voltage conversion circuit according to claim 1,
wherein during the phase shift control, with respect to the two switching elements connected in series in the switching circuit, the controller makes conduction ratios match each other and alternately performs on/off control with a dead-time period to perform soft switching in the dead-time period.

4. The direct-current voltage conversion circuit according to claim 1, further comprising:
two transformers connected to the switching circuit that are magnetically independent.

5. A switching power-supply device comprising:
a direct-current voltage conversion circuit comprising:
a switching circuit having a plurality of switching elements; and
a controller that controls operations of the plurality of switching elements,
wherein the controller:
executes an asymmetric pulse-width-modulation control that control a duty ratio by varying a pulse width of two switching elements included in the plurality of switching elements and connected in series and a phase shift control that control the duty ratio by varying an amount of phase shift of two switching elements included in the plurality of switching elements and not connected in series,
performs the phase shift control when the duty ratio is lower than a predetermined ratio, and
performs the asymmetric pulse-width-modulation control when the duty ratio is higher than or equal to the predetermined ratio; and
switching between the phase shift control and the asymmetric pulse-width-modulation control is performed, with step-down ratios being made to match each other;
performs control so that the step-down ratio for switching from the phase shift control to the asymmetric pulse-width-modulation control becomes higher than the step-down ratio for switching from the asymmetric pulse-width-modulation control to the phase shift control; and
a direct-current power supply electrically connected to an input terminal of the direct-current voltage conversion circuit.

6. A direct-current voltage conversion circuit comprising:
a switching circuit having a plurality of switching elements; and
a controller that controls operations of the plurality of switching elements,
wherein the controller:
executes an asymmetric pulse-width-modulation control that control a duty ratio by varying a pulse width of two switching elements included in the plurality of switching elements and connected in series and a phase shift control that control the duty ratio by varying an amount of phase shift of two switching elements included in the plurality of switching elements and not connected in series,
performs the phase shift control when the duty ratio is lower than a predetermined ratio, and
performs the asymmetric pulse-width-modulation control when the duty ratio is higher than or equal to the predetermined ratio; and
wherein switching between the phase shift control and the asymmetric pulse-width-modulation control is performed to match, wherein a change ratio of step-down ratios immediately before and after the switching is within a predetermined range of ±5%.

7. A switching power-supply device comprising:
a direct-current voltage conversion circuit comprising:
a switching circuit having a plurality of switching elements; and
a controller that controls operations of the plurality of switching elements,
wherein the controller:
executes an asymmetric pulse-width-modulation control that control a duty ratio by varying a pulse width of two switching elements included in the plurality of switching elements and connected in series and a phase shift control that control the duty ratio by varying an amount of phase shift of two switching elements included in the plurality of switching elements and not connected in series,
performs the phase shift control when the duty ratio is lower than a predetermined ratio, and
performs the asymmetric pulse-width-modulation control when the duty ratio is higher than or equal to the predetermined ratio; and
switching between the phase shift control and the asymmetric pulse-width-modulation control is performed, wherein a change ratio of step-down ratios immediately before and after the switching is within a predetermined range of ±5%; and a direct-current power supply electrically connected to an input terminal of the direct-current voltage conversion circuit.

\* \* \* \* \*